US010127280B2

(12) United States Patent
Tidwell et al.

(10) Patent No.: US 10,127,280 B2
(45) Date of Patent: Nov. 13, 2018

(54) AUTOMATIC RECURSIVE SEARCH ON DERIVED INFORMATION

(71) Applicant: Sumo Logic, Inc., Redwood City, CA (US)

(72) Inventors: Kenny Tidwell, Los Altos, CA (US); David Frampton, Portola Valley, CA (US); Brendan O'Connell, Sandown, NH (US)

(73) Assignee: Sumo Logic, Inc., Redwood City, CA (US)

( * ) Notice: Subject to any disclaimer, the term of this patent is extended or adjusted under 35 U.S.C. 154(b) by 275 days.

(21) Appl. No.: 15/052,529

(22) Filed: Feb. 24, 2016

(65) Prior Publication Data

US 2016/0253387 A1     Sep. 1, 2016

Related U.S. Application Data

(60) Provisional application No. 62/120,871, filed on Feb. 25, 2015.

(51) Int. Cl.
*G06F 7/00* (2006.01)
*G06F 17/30* (2006.01)
(Continued)

(52) U.S. Cl.
CPC .... *G06F 17/30477* (2013.01); *G06F 17/2705* (2013.01); *G06F 17/30321* (2013.01);
(Continued)

(58) Field of Classification Search
CPC ......... H04L 12/24; H04L 12/26; H04L 63/14; G06F 21/552
See application file for complete search history.

(56) References Cited

U.S. PATENT DOCUMENTS 5,182,811 A * 1/1993 Sakamura ............. G06F 9/4812
                                                    710/264
5,471,575 A * 11/1995 Giansante ............. G06F 17/245
                                                    715/202

(Continued)

FOREIGN PATENT DOCUMENTS

WO       2005/109754 A1     11/2005

OTHER PUBLICATIONS

International Search Report and Written Opinion of the International Searching Authority for PCT Application No. PCT/US2016/019591 dated May 6, 2016.

(Continued)

*Primary Examiner* — Daniel Kuddus
(74) *Attorney, Agent, or Firm* — Lowenstein Sandler LLP

(57) ABSTRACT

A processing device receives a query comprising a first field value and a time period. The processing device performs a first search of a data store using the first field value to identify a first plurality of events having the time period and a field that comprises the first field value. The processing device determines, for one of the plurality of events, a second field value of a second field that is specified in a first context definition, the second field having an assigned field type. The processing device automatically performs a second search of the data store using the additional field value to identify a second plurality of events having the time period and the additional field value. Information from the first plurality of events and the second plurality of events is aggregated, and a response to the query is generated that comprises the aggregated information.

20 Claims, 17 Drawing Sheets

(51) Int. Cl.
*H04L 29/06* (2006.01)
*G06F 17/27* (2006.01)
*G06F 21/55* (2013.01)

(52) U.S. Cl.
CPC .. *G06F 17/30368* (2013.01); *G06F 17/30424* (2013.01); *G06F 17/30528* (2013.01); *G06F 17/30557* (2013.01); *G06F 17/30569* (2013.01); *G06F 17/30589* (2013.01); *G06F 17/30598* (2013.01); *G06F 17/30864* (2013.01); *G06F 21/552* (2013.01); *H04L 63/14* (2013.01); *H04L 63/1416* (2013.01); *H04L 63/1425* (2013.01); *H04L 63/1441* (2013.01); *H05K 999/99* (2013.01)

(56) References Cited

U.S. PATENT DOCUMENTS

| | | | | |
|---|---|---|---|---|
| 6,088,712 | A * | 7/2000 | Huang | G06F 9/45512 |
| | | | | 715/201 |
| 7,024,431 | B1 | 4/2006 | Komelson et al. | |
| 7,382,247 | B2 * | 6/2008 | Welch | A61B 5/0024 |
| | | | | 340/539.12 |
| 7,515,043 | B2 * | 4/2009 | Welch | A61B 5/0024 |
| | | | | 340/539.12 |
| 7,523,504 | B2 * | 4/2009 | Shah | G06F 21/577 |
| | | | | 726/23 |
| 8,015,604 | B1 | 9/2011 | Tidwell et al. | |
| 8,209,759 | B2 | 6/2012 | Newton et al. | |
| 8,255,522 | B2 | 8/2012 | Marwah et al. | |
| 8,645,299 | B2 * | 2/2014 | Faughnan | G06F 19/345 |
| | | | | 600/300 |
| 2006/0026688 | A1 * | 2/2006 | Shah | G06F 21/577 |
| | | | | 726/25 |
| 2006/0161816 | A1 | 7/2006 | Gula et al. | |
| 2007/0203720 | A1 * | 8/2007 | Singh | G06Q 10/00 |
| | | | | 705/7.11 |
| 2008/0294596 | A1 | 11/2008 | Xiong | |
| 2011/0161269 | A1 * | 6/2011 | Faughnan | G16H 50/20 |
| | | | | 706/46 |
| 2012/0079596 | A1 * | 3/2012 | Thomas | G06F 21/55 |
| | | | | 726/24 |
| 2014/0013434 | A1 * | 1/2014 | Ranum | H04L 63/145 |
| | | | | 726/24 |
| 2015/0026167 | A1 | 1/2015 | Neels et al. | |
| 2016/0004733 | A1 | 1/2016 | Cao et al. | |
| 2016/0156642 | A1 | 6/2016 | Kouznetsov | |
| 2017/0076046 | A1 * | 3/2017 | Barnes | G06F 17/30864 |

OTHER PUBLICATIONS

Bhatt et al., "The Operational Role of Security Information and Event Management Systems", IEEE Computer and Reliability Societies, Sep./Oct. 2014, pp. 35-41.
Constantine, C., "SIEM and Logic Management—Everything you need to know but were afraid to ask, Part 1", Mar. 7, 2014, 4 pages, downloaded from https://www.alienvault.com/blogs/security-essentials/everything-you-wanted-to-know-about-siem-and-log-management-but-were-afraid on Aug. 21, 2017.
Constantine, C., "What kind of logs do you need for an effective SIEM Implementation?", Mar. 18, 2014, 5 pages, downloaded from https://www.alienvault.com/blogs/security-essentials/what-kind-of-logs-for-effective-siem-implementation on Aug. 21, 2017.
Fernandes, J.J., "SIEM—Your Complete IT Security Arsenal", copyright 2014, 16 pages, ZOHO Corp. Inc., cited by examiner in related U.S. Appl. No. 15/052,636 on Sep. 12, 2017.
European Patent Office, Extended European Search Report for European Patent Application No. 16756371.7 dated Aug. 13, 2018.

* cited by examiner

AUTOMATIC RECURSIVE SEARCH ON DERIVED INFORMATION

RELATED APPLICATIONS

This patent application claims the benefit under 35 U.S.C. § 119(e) of U.S. Provisional Application No. 62/120,871, filed Feb. 25, 2015, which is herein incorporated by reference.

TECHNICAL FIELD

Embodiments of the present invention relate, in general, to the fields of security information management (SIM) and security event management (SEM), and more particularly to a system that stores and searches events using contextual information.

BACKGROUND

A defensible cyber security posture for a party may mean that the party has deployed systems designed to detect and respond to threats. There are numerous types of systems including those within categories such as firewalls, intrusion detection systems, antivirus systems, malware protection systems, and threat reputation systems. When these systems detect a potential security issue, an alert or alarm is generated to call attention from an operator.

A large number of alerts are typically generated because very large numbers of generic and targeted attacks affect enterprises. Oftentimes so many alerts are generated that operators cannot keep up with the number of alerts. For well-tuned, high investment environments, an enterprise may see an average of 500 alerts per week. Other enterprises may see around 5000 alerts per week across all security systems of those enterprises.

An average alert response typically requires a minimum of 1 hour with some requiring much more time depending on complexity. An average full time security analyst may process 15-20 alerts per week. The gap between how many alerts security systems generate and how many a customer can process is large, and growing. Those unprocessed alerts represent heightened risk to the enterprises.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Figure 1:
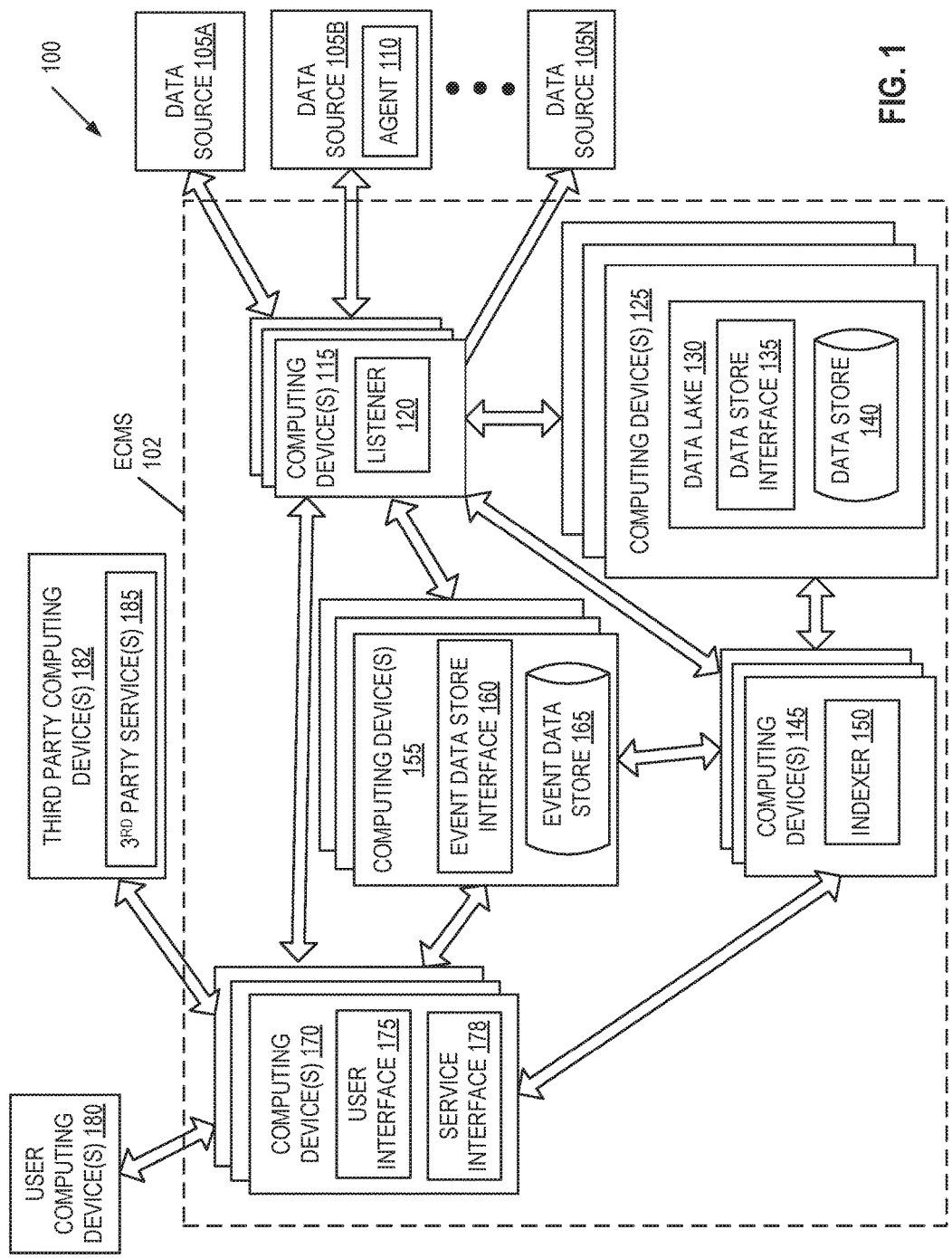
FIG. 1 is a block diagram depicting an example network architecture for an event context management system.

Embodiments are directed to an event context management system (ECMS). The ECMS may receive streams of log data (e.g., device logs and application logs) from many sources, convert log entries from the log data into events, and store the events in an event data store based on fields specified in source type definitions (also referred to herein simply as source types). Each event represents a particular log entry. The events that are stored in the data store may be based on log entries from various sources and may have different formats. Examples of log entries include simple network management protocol (SNMP) logs, reports from devices and/or applications running on devices, application programming interface (API) call records, information exchange protocols, remote authentication dial-in user service (RADIUS) logs, lightweight directory access protocol (LDAP) logs, security assertion markup language (SAML) messages, and so forth. These diverse events may all be stored and indexed in the event data store, which may be a non-homogenous database, in a manner that enables the events to be searched and linked together. Log entries may or may not be formatted using the Syslog message transport format. At any time context definitions may be modified in configuration data for the ECMS, which may modify how events are linked during searches. Thus, the links between events are not tied to a schema of the event data store in embodiments.

In embodiments, the ECMS receives multiple raw data streams, where each raw data stream contains messages including log data from a different data source. The ECMS system writes each raw data stream to a different raw data stream record in a first data store, which may be a data lake. For each raw data stream record, the ECMS determines a log format of log data in that raw data stream record. The ECMS uses the determined log format to determine boundaries of discrete log entries included in the messages from a raw data stream record and separates the messages into the discrete log entries to generate a corrected data stream. The ECMS may then write the corrected data stream to a corrected data stream record in the first data store.

Note that embodiments herein are described in relation to a raw data stream. The term "raw data stream" is used to refer to a data stream that contains "raw log data". The term "raw log data" is used to refer to log data that has not yet been prepared or organized for the generation of events and that contains an unknown number of partial and/or complete log entries. The raw log data may or may not be originally formatted data. Accordingly, the data stream referred to as a "raw" data stream may or may not contain actual originally formatted data. In some instances, a sender of the raw data stream may perform one or more operations on the raw data stream prior to sending it to cause the raw data stream to not have a perfect representation of an original format. Accordingly, a raw data stream may have contents that have not yet been modified or have been minimally modified by the ECMS.

In embodiments, the ECMS reads the discrete log entries from the corrected data stream record in the first data store. The ECMS then generates an event for each discrete log entry. To generate an event the ECMS may parse the discrete log entry based on the first log format to identify fields of the discrete log entry. To generate the event the ECMS may further identify a subset of the fields to be used as keys for indexing events in a second data store (e.g., in an event database), and assign a field type to each field in the subset of the fields. The ECMS may then write multiple event entries for the event into the second data store, wherein a separate event entry is written to the second data store for each field of the subset of the fields having an assigned field type. Different events may have different fields that are assigned field types. Accordingly, different events may be written to the second data store using different fields and field values as indexes. This may cause the data store to be a non-homogenous data store in which different index keys are used for different events.

Once events have been written to the second data store, the ECMS may receive a query (also referred to herein as a request) that includes a first field value and a time period. In some embodiments, the ECMS performs a first search of the second data store using the first field value to identify a first plurality of events having the time period and at least one field that comprises the first field value. The ECMS then determines, for a first event of the plurality of events, a second field value of a second field that is specified in a first context definition, the second field having an assigned field type. The ECMS performs a second search of the second data store using the additional field value to identify a second plurality of events having the time period and the additional field value. The second search is performed without receiving a second query. This process may be repeated for each event included in the first plurality of events. The ECMS then aggregates information from the first plurality of events and each of the additional plurality of events and generates a response that includes the aggregated information.

For each event that is discovered in the first search, the ECMS is able to identify fields that are relevant to an event context for that event. These fields may be specified as link keys in a context definition. The ECMS then determines one or more additional searches to run automatically using the field values of these identified fields. Aggregation of the information from the first search and the additional searches then provides a much fuller event context that may enable a user or service to make decisions about potential security threats, alerts, anomalies, and so forth.

In some embodiments, the ECMS receives a query including a first field value and a time period. The query may be received from a user via a user interface or from a third party service. The ECMS performs a first search of a data store using the first field value to identify a plurality of events having the time period and at least one field that has the first field value. The ECMS determines a first subset of the plurality of events associated with a first context definition. The ECMS determines fields specified in the first context definition. The ECMS then determines, for events in the first subset, field values of one or more fields specified in the first context definition. The ECMS may also perform additional searches of the data store using the field values of the one or more fields specified in the first context definition to identify additional events. Additionally, the ECMS may determine additional subsets of the plurality of events associated with other context definitions, and may determine field values of events in the additional subsets specified in the other context definitions. Additional searches may also be performed using the field values of the events in the additional subsets specified in the other context definitions. In one embodiment, the ECMS determines an event context for each event based on the field values and context definitions associated with those events. The ECMS generates a report based on the field values of the one or more fields specified in context definitions and/or based on the event contexts. In one embodiment, the ECMS generates a different report section for each context type. The ECMS then generates a response that includes at least a portion of the report and outputs the response.

The reports generated in embodiments provide consolidated information that may have been gathered from thousands of disparate events. The reports may be divided into separate sections based on context types such as a network context type, an endpoint context type, a threat context type, an identity context type, an identity context type, an application context type, a data context type, and so on. Each section may include summaries of the event contexts of events associated with a particular context type. The summaries may include aggregated data that combines identical or similar event contexts and further include counts of such. The summaries may, for example, identify a number of event contexts, most common event contexts, most relevant event contexts, and/or other useful information. Contexts derived from events from disparate data sources may also be combined and included in the summaries. From the report, a user may select any of the event contexts to access original log entries associated with the event contexts. These log entries may have many different formats, and may have original formats that may be familiar to analysts who are investigating a detected problem.

In some embodiments, the ECMS receives a query from a service, the query including a first field value, a time period and a content request. The ECMS performs a first search of a data store using the first field value to identify a plurality of events having the time period and at least one field that has the first field value. The ECMS determines a first subset of the plurality of events associated with a first context definition. The ECMS determines fields specified in the first context definition. The ECMS then determines, for events in the first subset, field values of one or more fields specified in the first context definition. The ECMS may also perform additional searches of the data store using the field values of the one or more fields specified in the first context definition to identify additional events. Additionally, the ECMS may determine additional subsets of the plurality of events associated with other context definitions, and may determine field values of events in the additional subsets specified in the other context definitions. Additional searches may also be performed using the field values of the events in the additional subsets specified in the other context definitions. In one embodiment, the ECMS determines an event context for each event based on the field values and context definitions associated with those events. The event contexts may then be aggregated. The ECMS determines, from the determined field values and/or event contexts, content that satisfies the content request. The ECMS then generates a response to the query that comprises the content and sends the response to the service.

Security information and event management systems (SIEMs) gather and analyze a large number of security events, and determine which of those security events may be important. SIEMs then generate ordered lists of such security events known as burn down lists. However, the SIEMs are not generally able to determine event context associated with the potentially important events. Such event context can be useful in determining whether particular security events should be included in the burn down lists. Embodiments enable third party services such as SIEMs to query the ECMS to ask for particular event context information. The ECMS can then determine the requested event context information and provide it to the SIEM to enable the SIEM to better determine which security events to include in the burn down list. SIEMs also perform many different types of correlation between events, and the event context information could be used as an input for any of those types of correlation to improve the correlation. Moreover, embodiments enable the security events included in the burn down list to be listed along with event context information.

Referring now to the figures, FIG. 1 is a block diagram depicting an example distributed network architecture 100 for an event context management system (ECMS) 102, in accordance with some embodiments. The ECMS 102 in one embodiment includes multiple computing devices 115, 125, 145, 155, 170, each of which executes different components of the ECMS 102. One or more computing devices 115 include instances of a listener 120. One or more computing devices 125 include instances of a data lake 130. One or more computing devices 145 include instances of an indexer 150. One or more computing devices 155 include instances of an event data store interface 160 and/or an event data store 165. One or more computing devices 170 include instances of a user interface 175 and/or a service interface 178. In alternative embodiments, one or more of the listener 120, data lake 130, indexer 150, event data store 165, user interface 175 and/or service interface 178 may execute on a single machine. For example, each of these components may execute on one machine. In another example, some components may execute on a first machine and other components may execute on a second machine. Accordingly, many different configurations of the ECMS 102 are possible.

Computing devices 115, 125, 145, 155, 170 may be hardware computing devices that include physical machines and/or virtual machines hosted by physical machines. The physical machines may be rackmount servers, desktop computers, blade servers, or other computing devices. In one embodiment, at least one of the computing devices 115, 125, 145, 155, 170 includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

One or more computing devices 115 may be arranged in a cluster. Similarly, one or more computing devices 125 may be arranged in a cluster, one or more computing devices 145 may be arranged in a cluster, one or more computing devices 155 may be arranged in a cluster and one or more computing devices 170 may be arranged in a cluster. The clusters may provide load balancing, high availability functionality, failover functionality, and so on. In instances where the computing devices are virtual machines, additional computing devices may be instantiated with appropriate components of the ECMS 102 as load increases. Similarly, virtual machines may be terminated as load on particular components of the ECMS 102 decreases.

The various computing devices 115, 125, 145, 155, 170 may be connected via one or more networks, which may include a local area network (LAN), a wide area network (WAN) such as the Internet, and or a combination thereof. Additionally, computing devices 115 may be connected to one or more data sources 105A, 105B through 105N via one or more networks. User computing devices 180 and/or third party computing devices 182 executing third party services 185 may be connected to computing devices 170 via one or more networks.

Data sources 105A-N are providers of raw data streams of log data. Data sources 105A-N may be devices in an enterprise environment (e.g., on a network of an enterprise) that produce log data. Examples of such devices include computing devices (e.g., server computing devices) that generate system logs, firewalls, routers, identity management systems, switches, and so on. Data sources 105A-N may also include applications, services, modules, etc. that generate log data. The log data in the raw data streams may differ between data sources 105A-N. Examples of log data formats include Syslog messages, simple network management protocol (SNMP) logs, reports from devices and/or applications running on devices, application programming interface (API) call records, information exchange protocols, remote authentication dial-in user service (RADIUS) logs, lightweight directory access protocol (LDAP) logs, security assertion markup language (SAML) messages, and so forth.

The mechanism of receiving the raw data streams may differ between data sources 105A-N. In some instances, a data source 105A-N establishes a connection to listener 120 using a particular port and internet protocol (IP) address. Connections may be made, for example, using transmission control protocol (TCP) or user datagram protocol (UDP). For example, if TCP is used then the data source 105A-N may send hypertext transport protocol (HTTP) and/or HTTP over secure socket layer (HTTPS) messages. If standard HTTP or UDP are used to send a raw data stream, then the data source 105A-N may encrypt the raw data stream before sending to secure log data in the raw data stream. Listener 120 may then decrypt the raw data stream on receipt.

For some data sources 105A-N, the listener 120 periodically queries the data source 105A-N for the raw data stream containing the log data. For example, data source 105N may include an account of a third party service such Salesforce.com®, DropBox®, Box®, and so on. In such an instance, listener 120 uses provided account credentials to log into an account of a customer and query the third party service for log data.

Some data sources such as data source 105B may not include a native capability to send log data to listener 120 via either a push model or a pull model. In such instances, an agent 110 may be installed on the data source 105B. The agent 110 may collect log data from the data source 105B and may send a raw data stream containing the log data to listener 120. For example, agent 110 may scan directories and/or files on a device to generate log data (e.g., identifying file contents in the directories and/or information about scanned files), and may then send that log data to listener 120. In another example, agent 110 may scan commit logs of a database, may generate pseudo log entries from the commit logs, and may send the pseudo log entries to listener 120. In one embodiment, agent 110 encrypts log data before sending it to listener 120. Alternatively, or additionally, agent 110 may receive a raw data stream from the data source 105B via UDP and may then send the raw data stream to listener 120 via TCP. Accordingly, agent 110 may provide additional mechanisms and/or protocols not natively supported by data source 105A to enable data source 105A to send log data using those mechanisms and/or protocols.

In some embodiments, the agent 110 records metadata indicating the data source 105A, such as names of files and/or file paths that data is collected from, names of directories that data is collected from, ports at which the agent received log data, IP addresses from which the agent 110 received log data, and so on. The provided metadata may later be used by the listener 120 to identify a data source. For example, if an agent 110 receives log data from multiple different data sources, that agent 110 may record metadata associated with each of those data sources to enable the listener 120 to distinguish between raw data streams from those two data sources. In another example, agent 110 may scan directories for log files, and may find multiple different log files all having different log formats. By transmitting information about the particular log files, agent 110 may enable the listener 120 to determine each of those log formats.

In some instances, enterprises may be configured to collect log data for third party systems such as SIEMs. In such an embodiment, the enterprises may additionally send the log data to listener 120. Alternatively, or additionally, listener 120 may receive the log data directly from the SIEMs. Such log data may be received before and/or after the SEIMs operate on the log data.

Listener 120 is a component of the ECMS 102 that receives raw data streams and writes the raw data streams to a data lake 130. Listener 120 listens for raw data streams from many different data sources 105A-N. Listener 120 creates a separate raw data stream record in the data lake 130 for each data source, and writes the raw data stream from that data source 105A-N into the appropriate raw data stream record. Each raw data stream may be a constant or periodic stream of data. For example, some data streams may be sent once a day at a particular time. Other data streams may be sent as new data becomes available. Data streams may also be received at other regular or non-regular periodicity.

Data lake 130 is a large object-based data store 135 accompanied by a processing engine (data store interface 135) to operate on data in the data store 135. Data lake 130 may be capable of storing and operating on any type of data, regardless of a format of that data. Data lake 130 stores data such as raw data streams in a native format of the data. Examples of data lakes include Azure Data Lake®, Kafka®, Rabbit MQ®, and Hadoop®. Data store interface 135 receives read and write requests, and performs reads to the data store 140 and writes from the data store 140 responsive to those read and write requests. For example, data store interface 135 may receive write requests from listener 120 to write messages containing log data of a raw data stream to a raw data stream record. Data store interface 135 may also respond to read and write requests from indexer 150.

Indexer 150 reads log data from the data lake 130, generates events from the log data, and writes those events to event data store 165. Responsive to reading log data from a raw data stream record in the data lake 130, indexer 150 may break the log data into discrete log entries, and write those discrete log entries to a corrected data stream record in the data lake 130. Indexer 145 may then read discrete log entries from the corrected data stream record, and determine fields of the discrete log entry to be used as link keys and/or index keys for that log entry. The indexer 145 generates an event for that discrete log entry, and writes a separate instance of the event to the event data store 165 for each determined link key or index key. The number of fields and selection of specific fields of the log entry to use as link keys and/or index keys may vary from event to event based on log format and/or a source type of a data source that the log entry was received from. Each field designated as a link key and/or index key may be used to index the event in the event data store.

Event data store 165 is a data store used to store events. In one embodiment, event data store 165 is a database other than a relational database (e.g., a NoSQL database). In one embodiment, event data store 165 is implemented using a NoSQL database that uses a key-value store, a document store, and/or a wide column store. Examples of NoSQL databases that may be used for the data store 165 include Apache Casandra®, MongoDB®, and Redis®. However, many other types of NoSQL databases may alternatively be used. Event data store interface 160 executes queries to search the event data store 165 and executes write requests to write to the event data store 165. The write requests may be received, for example, from indexer 150 and/or listener 120. The queries may be received, for example, from listener 120, user interface 175 and/or service interface 178.

User interface 175 may be a web interface that users may access from user computing devices 180. For example, user interface 175 may be a web server that serves web pages, and user computing devices 180 may execute web browsers that interface with the user interface 175. Via the user interface 175, users may request queries to the event data store 165. A query may include one or more field values, identification of one or more fields or field types associated with the field values, and/or a time period. A query may additionally include a specific content request, such as a request to identify a user, a request to identify a device, a request for specific types of event contexts, and so on. Responsive to receiving request from a user computing device 180, user interface 175 generates a query and sends the query to event data store interface 160. Event data store interface 160 then searches the event data store and returns results to user interface 175. User interface 175 then analyzes the data, consolidates it, generates a report, and sends the report to the user computing device 180.

Service interface 178 performs similar operations to those of user interface 175, but interfaces with third party services 185 rather than users. Examples of such third party services include SIEM services such as HP Arcsight®, Novell NetIQ®, IBM Q1 Labs®, Quest®, Splunk®, and so on. Service interface 178 may receive a query request from a third party service 185, and may issue a query to the event data store 165 in a similar manner as described with reference to the user interface 175. The service interface 178 may then generate a response to the initial request from the third party service 185 in accordance with the type of information requested by the third party service 185. Additionally, service interface may determine a format for responding to the third party service 185, and may format the response in accordance with the determined format.

Figure 2:
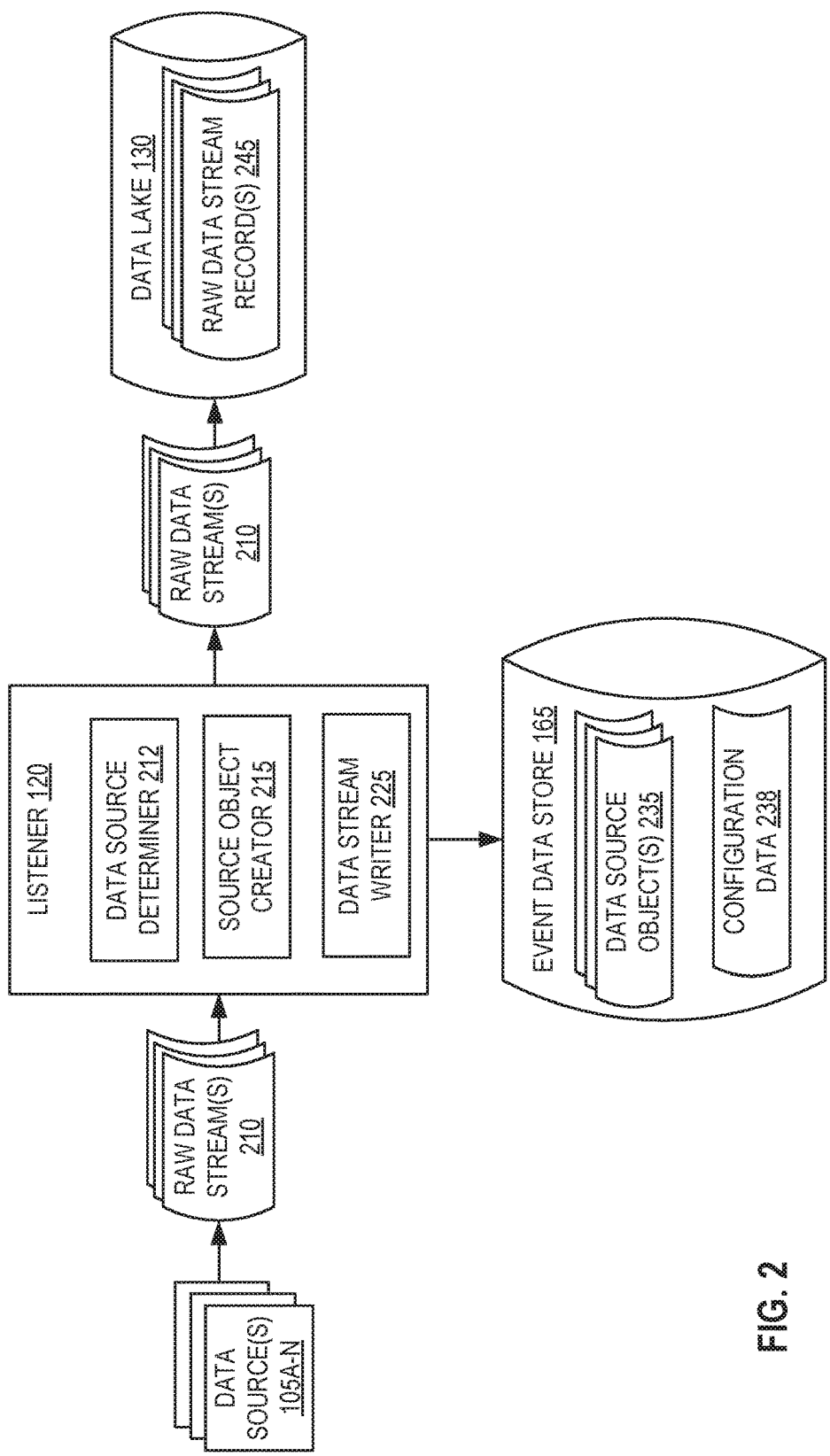
FIG. 2 is a block diagram of a listener of an event context management system.

FIG. 2 is a block diagram of a listener 120 of an event context management system. In one embodiment, listener 120 includes a data source determiner 212, a source object creator 215 and a data stream writer 225. Alternatively, the functionality of the data source determiner 212, source object creator 215 and/or data stream writer 225 may be combined into a single module or divided into multiple modules. Moreover, multiple instances of the source object creator 215 and/or data stream writer 225 may be instantiated in listener 120.

Listener 120 receives raw data streams 210 from multiple different data sources 105A-N. The raw data streams 210 may each include one or more messages, where each message includes anywhere from a part of a single log entry to many log entries. The raw data stream 210 may include one line of data or multiple lines of data that arrive in a single flow of data. The different raw data streams 210 is an initial data stream that may include log data of various different formats. However, it can be assumed that all log data from a single data source will have the same log format.

The log data received in the raw data streams 210 may be data that has been generated from native sources. Examples of log data include Syslog entries, simple network management protocol (SNMP) logs, reports from one or more systems, logs of application programming interface (API) calls, logs associated with information exchange protocols, remote authentication dial-in user service (RADIUS) logs, lightweight directory access protocol (LDAP) logs, security assertion markup language (SAML) logs, and so on.

Responsive to receipt of a raw data stream 210, data source determiner 212 determines a data source 105A-N from which the raw data stream 210 was received. As discussed above, the raw data streams may be received in many ways. For example, raw data streams may be pushed by data sources via UDP or TCP, may be pulled from data sources via UDP or TCP, may be received based on using uniform resource locators (URLs) to access third party services (e.g., Salesforce.com®, Dropbox®, etc.) using HTTP requests, may be retrieved from directories or files, may be received from agents, and so on. Data source determiner 212 uses information on how the raw data stream 210 arrived at the listener 120 and where the raw data stream 210 came from to determine the data source 105A-N that the raw data stream 210 was received from.

In a first example, one or more data streams may be received via UDP or TCP at a particular port of the listener 120. If multiple data streams are received at the same port, then the IP addresses of the sender may be used to distinguish between data sources. A combination of the sender IP address and the port at which the data stream is received may be used to distinguish data sources. For example, a stream received at a particular port from a particular IP range may be from a first data source that sends firewall logs, and a stream received at a port from another IP range may be from a second data source that sends domain name system (DNS) logs. In a second example, the data stream may be data retrieved from a particular URL. In a third example, the data stream may be log data collected from a particular directory having a directory name and/or file having a file name and file type. The IP addresses and/or ports, host names, URLs, file names, file types, file paths, directory names, delivery method and/or other information may be used to identify a particular data source 105A-N.

Once the data source 105A-N is identified, if the data source 105A-N is a new data source data source determiner 212 attempts to determine a source type associated with the new data source. Data source determiner 212 may use the information on where the raw data stream came from and how the raw data stream arrived at the listener 120 to perform a lookup in configuration data 238. For example, port data and/or IP address data associated with the raw data stream 210 may be used to perform a lookup in the configuration data 238.

Figure 5:
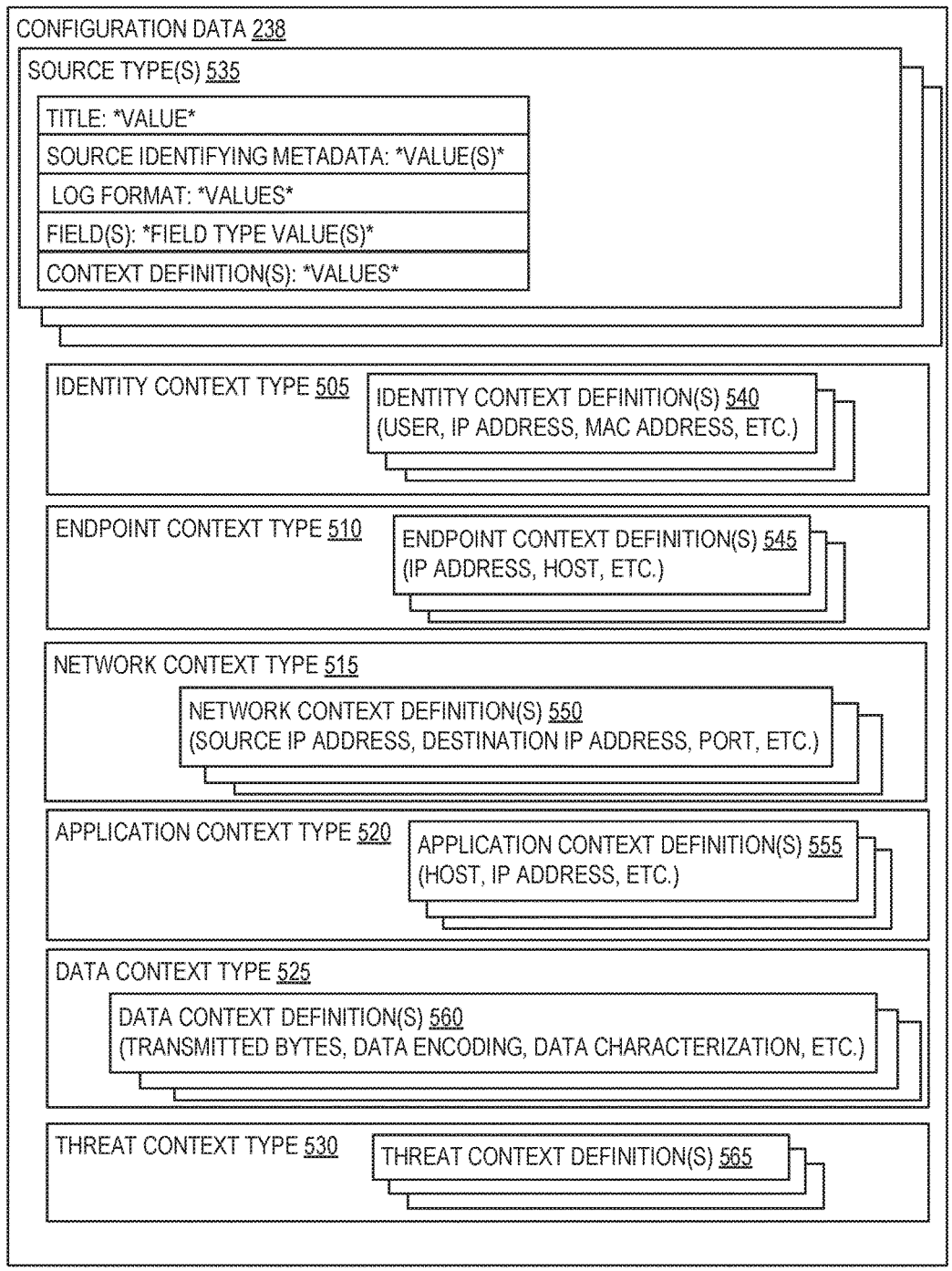
FIG. 5 is a block diagram of sample configuration data for an event context management system.

The configuration data 238 may include entries for multiple different source types. Each entry may include information identifying one or more log formats based on data sources, how data is received from the data sources, and how the data arrives at the listener 120. For example, a particular source type may include an entry identifying particular IP address(es) and/or port(s) associated with the source type. In this example, raw data streams received from the particular IP address and at the particular port number may be identified as having the particular source type. A source type may additionally include a definition of a log format, one or more context definitions, fields to assign field types to, and/or additional information. An example of configuration data 238 is illustrated in FIG. 5.

For convenience the configuration data 238 is shown as being located in the event data store 165. In such an embodiment, the configuration data 238 may be managed by a configuration service on the event data store 165. Alternatively, the configuration data 238 and a configuration service may be deployed on a separate computing device that does not include the event data store 165. In other embodiments, copies of the configuration data 238 may be stored at each of the computing devices 115, 125, 145, 155, 170 discussed with reference to FIG. 1.

Source object creator 215 may create a data source object 235 for the new data source in the event data store 165. Alternatively, source object creator 215 may create the data source object 235 in a data store other than the event data store 165. For example, a separate data store may be maintained for data source objects in an embodiment. In one embodiment, to create the data source object in the event data store 165 source object creator 215 issues a command to data store interface 135 to cause the data store interface 135 to create the data source object 235. A unique data source identifier (ID) is assigned to the data source object, and may be used to identify data streams, messages, events and log entries associated with that data source object. The data source ID may be a universally unique identifier (UUID) in some embodiments.

If data source determiner 212 was able to determine the source type associated with the data source object, an identification of that source type is added to the data source object 235. This enables other components of the ECMS to later determine a log format for log entries from the data source, separate log entries from the raw data stream from that data source, parse log entries from that data source, assign field types to fields of the log entries from the data source, determine context definitions associated with the log entries, generate events for the log entries, and so on.

Data stream writer 225 creates a new raw data stream record 245 in the data lake 130 to store the raw data stream 210 from the new data source. This may include issuing a command to data store interface 135 to cause the data store interface 135 to generate the raw data stream record 245 in data store 140. Data stream writer 225 includes the data source ID (and in some instances the determined source type) in the command, and the data source ID is included in a raw data stream record ID of the raw data stream record 245. In one embodiment, the raw data stream record ID for the raw data stream record includes the data source ID as a root and an identifier of the stream type. A raw data stream record may have the format "UUID-raw". For example, if the data source ID was "firewall2", then the raw data stream record ID may be "firewall2-raw". In some instances, the source type is also identified for the raw data stream record.

Once a data source object 235 and raw data stream record 245 have been generated for a particular data source 105A-N, new data in the raw data stream 210 from that data source 235 is written to the raw data stream record 245 associated with the data source object 235. To write a raw data stream 210 to the data lake 130, data stream writer 225 may issue a write command including at least one of an appropriate data source ID or raw data stream record ID to the data store interface 135. The data store interface 135 may then write the raw data stream record 210 to the raw data stream record 245 having the raw data stream record ID that matches the received raw data stream record ID or that partially matches the received data source record ID. The data lake 130 may have many raw data stream records 245, where each raw data stream record 245 includes log data from a single data source 105A-N.

In one embodiment, listener 120 splits the raw data stream 210 into equally sized data chunks or blocks. For example, the listener 120 may split the data into 10 kb blocks, 4 kb blocks, 1 Mb blocks, or blocks having other sizes. Each block may contain a number of complete log entries and may contain one or more partial log entries. Each block may be tagged with the source object ID and/or an identifier of the source type associated with the raw data stream 210. Additionally, each block may be tagged with a time stamp representing the receipt time (when the block was received from the data source). In one embodiment, the data lake 130 is a messaging system that guarantees message order. This may ensure that partial log entries that span two messages can be merged into complete log entries.

Listener 120 may send a notice to the indexer to wake the indexer and cause the indexer to begin processing log data in the raw data stream record 245 once that log data is written in the data lake 130. When data stream writer 225 writes data in a raw data stream 210 to the raw data stream record 245, data stream writer 245 may determine an amount of time that has passed since log data was previously written to the raw data stream record 245. If more than a threshold amount of time has passed (e.g., 10 minutes, 4 hours, 1 day, etc.), then listener 120 may send the notice to the indexer. In one embodiment, the data lake 130 includes a notice data stream record, and the notice is sent to the indexer by writing the notice to the notice data stream record. The notice may indicate the raw data stream record 245 that contains data to be processed. The indexer may periodically or continuously check the notice data stream record. Response to identifying a new entry in the notice data stream record, the indexer may read the entry to determine a raw data stream record having new log data to process, and may then process that new log data.

Figure 3:
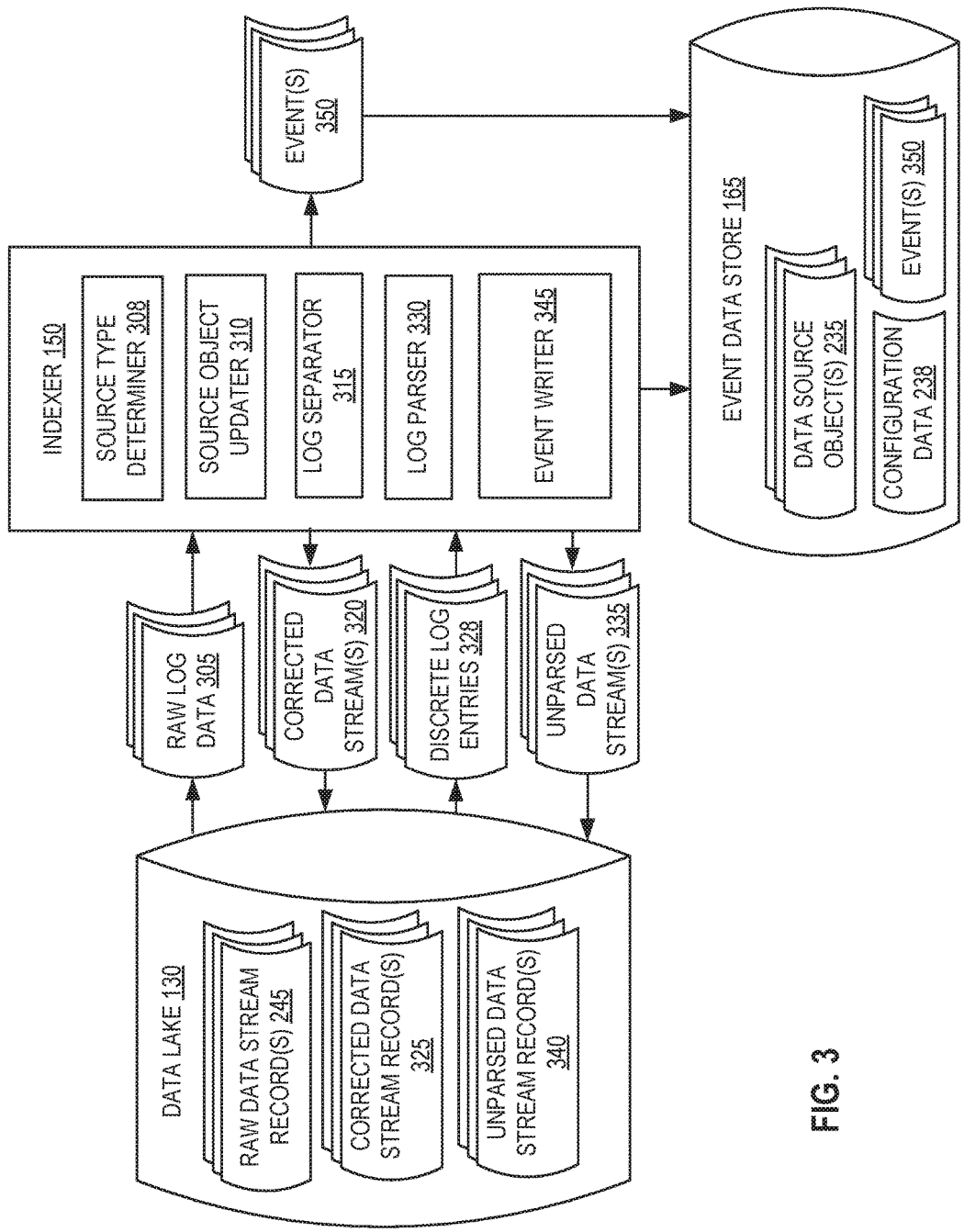
FIG. 3 is a block diagram of an indexer of an event context management system.

FIG. 3 is a block diagram of an indexer 150 of an event context management system. In one embodiment, indexer 150 includes a source type determiner 308, a source object updater 310, a log separator 315, a log parser 330 and an event writer 345. Alternatively, the functionality of the source type determiner 308, source object updater 310, log separator 315, log parser 330 and/or event writer 345 may be combined into a single module or divided into multiple modules. Moreover, multiple instances of the source type determiner 308, source object updater 310, log separator 315, log parser 330 and/or event writer 345 may be instantiated in indexer 150.

Log separator 315 retrieves raw log data 305 from raw data stream records in the data lake 130. The raw log data 305 may be log fata having an original format that the log data had when it was initially created, or close thereto. Alternatively, the raw log data may be log data that has been minimally modified (e.g., by tagging the log data with a source ID and/or a source type). The raw log data 305 may be retrieved by issuing read commands to data store interface 135 of the data lake 130. Responsive to receiving raw log data 305, log separator 315 determines whether the source type is known for the data source object associated with the raw log data 305. In one embodiment, log separator 315 determines the data source ID associated with the raw data stream record 245 that the raw log data 305 is retrieved from, and issues a query to the event data store 165 using the data source ID. The event data store 165 may then return the data source object 235 having the data source ID and/or may return specific information about the data source object 235 (e.g., a particular source type or an indication that the source type is unknown). Alternatively, the source type or unknown source type may be identified in metadata associated with the raw log data (e.g., in a header of the raw log data).

If the source type for the data source object 235 is unknown, source type determiner 308 analyzes the raw log data 305 to attempt to determine the source type based on the contents of the raw log data 305. Based on the analysis of the raw log data, source type determiner 308 may determine information such as a file type, and may further determine a pattern in the log data and/or common elements in the log data. For example, source type determiner may identify a common header format, common fields, data type, and so on between log entries.

Source type determiner 308 may then compare the determined information, pattern and/or common elements to known log formats associated with source types. In one embodiment, source type determiner 308 compares the determined information, pattern and/or common elements to each of the log formats of source types included in configuration data 238. If the determined information, pattern, common elements, etc. match the elements of a known log format associated with a source type, then source type determiner 308 determines that the data source that originated the raw log data 305 has that source type. Source object updater 310 may then update the data source object 235 associated with the raw data stream record 245 to include an indication of the source type.

If source type determiner 308 is unable to determine the source type associated with a particular data source object 235 (and the associated raw log data 305 and raw data stream record 245), then no further action may be taken at that time. The data source determiner 308 may later analyze the raw log data 305 from the raw data stream record 245 again after more raw log data has been written to the raw data stream record 245. The additional log data may be sufficient to enable the data source determiner 308 to determine the source type of the data source from which the log data was received. This process may be repeated until the source type can be identified. In some instances, a data source may be associated with a new source type that is not reflected in the configuration data 238. In such an instance, the source type would not be determined until the configuration data 238 is updated to include that new source type.

If the source type associated with raw log data is known, then indexer 150 has information that identifies how to parse the raw log data, including information that can be used to identify the beginning and ending of discrete log entries in the raw log data 305. The raw log data 305 may include multiple messages that were received from the data source. Each message may include a part of a log entry, a full log entry, multiple full log entries, or some partial log entries and some full log entries. For example, a message may include a partial log entry at the beginning, multiple complete log entries, and then a partial log entry at the end. Log separator 315 uses the log format information from the source type associated with the raw log data to identify the borders (e.g., the beginnings and endings) of each discrete log entry in the messages. Log separator 315 then separates the raw log data 305 into well-formed discrete log entries.

Messages may be stored in the data lake 130 in the order in which they are received, may be stamped with time stamps, and may be read from the raw data stream record 245 in order based on the time stamps. If the end of a first message contains a partial log entry (e.g., the start of a log entry), then the subsequent message will contain the rest of that log entry (e.g., the end of the log entry). Log separator 315 may merge the partial log entries from two sequential messages to form a complete discrete log entry.

Log separator 315 generates a corrected data stream 320 that includes the separated discrete log entries, and writes the corrected data stream 320 to a corrected data stream record 325 in the data lake 130. The corrected data stream record 325 in one embodiment contains the data source ID and a further identifier that indicates that the corrected data stream record contains discrete log entries. In one embodiment, the corrected data stream record 325 has a label of "UUID-single". For example, if the data source ID was "firewall2", then the ID for the corrected data stream record 325 may be "firewall2-single".

Log parser 330 reads discrete log entries 328 from the corrected data stream records 325 and parses those discrete log entries 328. Responsive to receiving a discrete log entry 328, log parser 330 determines the source type associated with that discrete log entry 328. For example, log parser 330 may perform a lookup using the UUID associated with the discrete log entry to receive the data source object 235 having that UUID. The log parser 330 may then determine the source type included in the data source object 235. Alternatively, the source type may be identified in the discrete log entry 328. Log parser 330 may then use the determined source type to determine a log format of the discrete log entry based on the configuration data 238. The source type may be or include a transform that will transform particular log entries into events, which are discussed in greater detail below.

In determining the log format of the discrete log entry 328, log parser 330 may initially determine a high level format for the discrete log entry, and then determine low level formatting of the discrete log entry 328. The high level format may include a comma separated values (CSV) format, an extensible markup language (XML) format, a Javascript® object notation (JSON) format, a regular expressions (REGEX) format, and so on. The low level format may include the specific fields of the log entry and the location of those fields in the log entry. The low level format may additionally include information on compound values of particular fields and how to separate those compound values into multiple discrete values. For example, a field might contain the values of "IP address: port." The low level format may indicate this compound field and how to break the compound field into separate fields, one being an IP address field having the field value of "IP address" and the other being a port field having the field value of "port".

The low level format may also include additional information on how to interpret the field values of the fields in the discrete log entry 328. For example, the data in the discrete log entry 328 may be interpreted differently depending on the field value of a specific field (or fields) in the discrete log entry 328. The configuration data 238 may further indicate how to interpret the data in the discrete log entry 328 based on the field value of the specific field.

In one embodiment, a source type may include references to additional transforms that will be used to interpret specific portions of the discrete log entry 328 and to assist in generating an event from that discrete log entry 328. Additional transforms may be included in the configuration data, and may be referenced in source types.

The source type (and in some instances the additional transforms) describe how to parse a log entry based on the high and low level formatting of the log entry. The source type (and in some instances the additional transforms) further defines a subset of the fields in the log entry that are to be assigned field types as well as the field types to assign to those fields. The field types identify fields that are to be used as index keys and that are to be later used as link keys for linking events during searches for events. Those fields that are not assigned field types will not be used as link keys or index keys.

Log parser 330 then generates an event based on the discrete log entry, where the event is a version of the discrete log entry that is annotated with additional information such as the assigned field types. In one embodiment the event includes a dictionary of key value pairs, where each key value pair in the dictionary includes a field name as the key and a field value as the value. Those key value pairs associated with fields that have been assigned field types may further include a field type value. Alternately, the field type information may be included as additional key value pairs in a field type section of the dictionary. Events additionally include a start time and potentially an end time, which may be determined from fields in the discrete log entry and represented as fields in the event.

Examples of field types that may be assigned to fields include "IP address", "MAC address", "user ID", "host ID", and so on. Each source type may indicate a different set of fields that are to be assigned field types. At any time, the source type may be updated to modify the fields that are to be assigned field types, and therefore to modify the fields that will be used as index keys and/or link keys.

Most log entries contain many fields that do not contribute useful information for determining event context, for investigating security concerns, for investigating network problems, or for other purposes. Such fields may dilute and/or obfuscate those fields that do contain useful information. By generating events that identify those fields that contain useful information and specifying those fields for use as index keys and/or link keys, meaningful relationships between events can be determined in queries to the event data store 165. For example, if two events both contain the same device IP address that has been assigned an IP address field type, those two events may be linked based on that host IP address during a search, and information from both of the events may be used to determine a context surrounding the two events.

In some embodiments, each of the assigned field types has a uniform data format. Accordingly, all fields that are labeled with a particular field type will represent data in the same way. For example, for IPv6 IP addresses may be represented in numerous different ways. However, the IP address field type may specify a particular format to represent IP addresses. If a log entry uses a different format to represent an IP address, log parser 330 may invoke a transform to cause the IP address of a field associated with the IP field type to be reformatted from the different format to the particular format set forth in the IP address field type. This may ensure that matches for the same IP address will occur between events.

In other embodiments, fields having a particular field type are mapped to a particular data format. For example, all IP addresses may be mapped to an internal address format, which may be included in the configuration data. The field values may be written in their original format, but may be converted to the internal format for event context generation and queries into the event data store. This may ensure that matches for the same IP address, for example, will occur between events without actually modifying the original field values.

Once the log parser 330 has generated an event 350 from a discrete log entry 328, event writer 345 writes that event 350 to the event data store 165. Multiple instances of a single event may be written to the event data store 165. In one embodiment, event writer 345 writes an event entry for the event 350 to the event data store 165 once for each field of that event that has an assigned field type. Each event entry for the event 350 may be indexed in the event data store 165 using the field value of a specific field of the event that has an assigned field type. In one embodiment, each event entry for the event 350 is indexed in a particular table associated with a particular field type. Each table may include a primary key corresponding to a particular field type.

Events may span a period of time (e.g., may include a start time and an end time). In some embodiments, events are stored in time period partitions in the event data store (e.g., partitions that are bounded by day, by week, by hour, etc.). In such an embodiment, if an event spans multiple time periods, then that event may be written into the event data store for each partition having a time period that the event's time span overlaps. In an example, events are partitioned by day and an event starts at 11:30 PM on day 1 and ends at 12:30 AM on day 2. The example event has 4 fields that have assigned field types. In this example, the event would be written into the day 1 partition four times (once for each field having an assigned field type) and would be written into the day 2 partition four times (once for each field having an assigned field type).

In one embodiment, there is a separate event writer 345 for each field type. A particular event writer 345 may include information on how to write an event to the event data store 165 using a field value of a field having a particular field type. For example, an IP address event writer may be used to write events to the event data store 165 in a manner that indexes the event using an IP address. In one embodiment, to write an event to an event data store the event writer 345 sends an instruction to a DBMS that manages the event data store (e.g., to event data store interface 160). Thus, a separate instruction may be sent to the DBMS for each field of an event that has been assigned a field type. A user ID event writer may be used to write events to the event data store 165 in a manner that indexes the event using a user ID. Multiple different event writers may write the same event to the event data store 165.

In an example, an event may include a source IP address field having an IP address field type, a destination IP address field having an IP address field type and a port field having a port field type. The event may be indexed in an IP address field type table based on the field value of the destination IP address field, may be further indexed in the IP address field type table based on the field value of the source IP address field, and may be further indexed in a port field type table based on the field value of the port field.

In one embodiment, in which the event data store 165 is implemented on a cluster of machines, different machines in the cluster may contain different field type tables. This may distribute the load associated with searching tables between machines and improve search speeds for the event data store 165.

In some instances log parser 330 may be unable to successfully parse a discrete log entry 328 from a corrected data stream record 325. Before parsing a discrete log entry, log parser may first determine whether that discrete log entry satisfies one or more criteria. In one embodiment, the one or more criteria include a parsable criterion. If the discrete log entry is parsable, log parser 3330 performs the operations of parsing the log entry, generating an event, and writing the event to the event data store.

In one embodiment, log parser 330 generates an unparsed data stream 335 containing the unparsed log entries from a corrected data stream record 325. Log parser 330 then writes the unparsed data stream 335 to an unparsed data stream record 340 in the data lake. In one embodiment, the unparsed data stream record 340 has a label of "UUID-unparsed". For example, if the data source ID was "firewall2", then the ID for the unparsed data stream record 340 may be "firewall2-unparsed". Accordingly, the data lake 130 may contain three separate data stream records 245, 325, 340 for each data source.

The unparsed log entries in an unparsed data stream record 340 may be modified by a user and/or process to place those unparsed log entries into a form that is parsable. Once the unparsed log entries have been modified, log parser 330 may read these unparsed log entries from the unparsed data stream record 340 to generate events as described above. Alternatively, or additionally, the log parser 330 may be updated to enable the log parser 330 to parse one or more previously unparsable log entries. The log parser 330 may be updated by a software update in some embodiments. Alternatively, or additionally, the system type associated with an unparsed data stream record may be updated in configuration data. The system type may initially have been incorrectly configured (e.g., with incorrect log format data), and this may have caused one or more unparsed log entries associated with that source type to be unparsable. Updating the system type may correct such issues in some embodiments.

Figure 4:
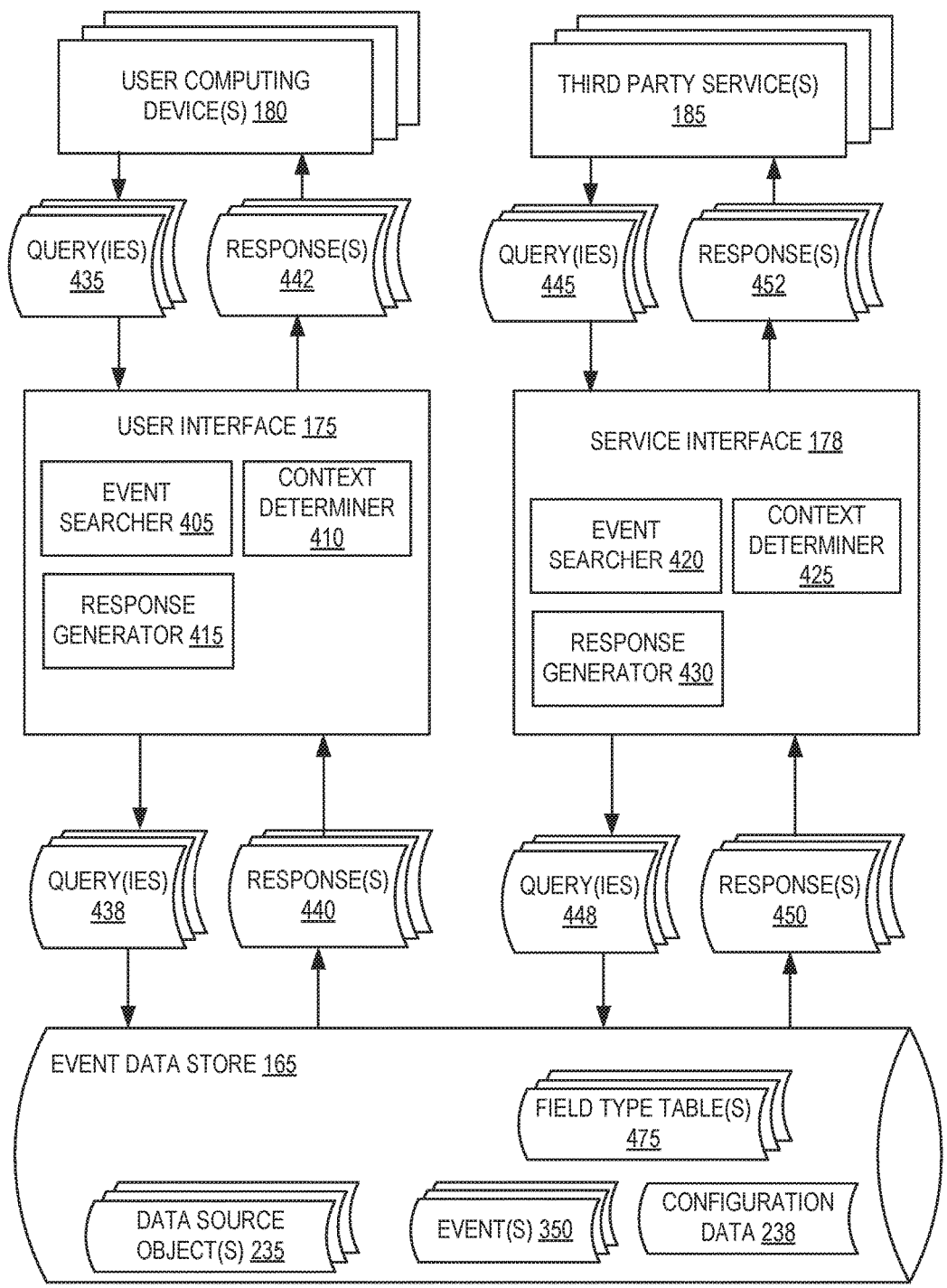
FIG. 4 is a block diagram of a user interface and a service interface of an event context management system.

FIG. 4 is a block diagram of a user interface 175 and a service interface 178 of an event context management system. The user interface 175 and the service interface 178 each perform the function of receiving, acting on, and responding to queries or requests from clients. User interface 175 may interface with users and provide a graphical user interface that is navigable by a user. In contrast, service interface 178 may interface with services such as a security event management (SEM) system, a security information management (SIM) system, a security event and information management (SIEM) system, an intrusion detection system (IDS), a user behavior analytics system (UBA), or other system.

User interface 175 and service interface 178 may contain similar components and perform similar operations. However, how the user interface 175 and service interface 178 interact with clients and how they package data for clients may differ. In one embodiment, user interface 175 includes an event searcher 405, a context determiner 410 and a response generator 415. Similarly, service interface 178 may include an event searcher 420, a context determiner 425 and a response generator 430. Alternatively, the functionality of the event searcher 405, context determiner 410 and/or response generator 415 may be combined into a single module or divided into multiple modules. Similarly, the functionality of the event searcher 420, context determiner 425 and/or response generator 430 may be combined into a single module or divided into multiple modules. In some embodiments, the user interface 175 and service interface 178 may be combined into a single module that can service requests from both users and third party services.

User interface 175 may be a web server that receives requests 435 from user computing devices 180 via HTTP and sends responses 440 to those requests via HTTP. User computing devices 180 may be desktop computers, server computers, laptop computers, tablet computers, or other types of computing devices. The user computing devices 180 may execute web browsers that interface with the user interface 175 using HTTP. Alternatively, the user computing devices 180 may execute applications that are specifically configured to interface with user interface 175.

User interface 175 receives requests 435 from user computing devices 180. The requests may be queries or requests to issue queries to the event data store 165. Users may be administrators or operations personnel who issue requests to user interface 175 to resolve problem tickets, investigate alerts about possible problems in an enterprise's operation, and so on. For example, an administrator may receive a report that a network is down, that a particular employee cannot access a web server, that a network is slow, and so on. In another example, an identity management device may alert the user that a particular employee has failed to successfully log in to an account a threshold number of times, which might mean that someone is trying to brute force an entry onto a system of an enterprise.

The administrator may start with minimal information about a problem or alert, such as the particular device that generated the alert, the particular network that is experiencing a problem, a time that the problem occurred, and so on. The administrator may then issue a query to the user interface 175 that includes the known information.

In another example, a SIEM may generate an ordered list of potential threats known as a burn down list and provide this list to the user. The user may then select a log entry from the burn down list and input field values from the selected entry into a query to the user interface.

In one embodiment, user interface 175 receives the ordered list of potential threats (e.g., the burn down list) from a SIEM. The user interface 175 may display the burn down list to a user, and the user may select a log entry from the burn down list that the user wishes to investigate. In one embodiment, the user interface 175 provides a graphical interface in which the user is able to select the log entry from the burn down list, and is able to further select specific field values from the selected log entry to perform searches on.

A request from a user computing device 180 may indicate one or more field values and a time period. The request may also indicate one or more fields or field types associated with the provided field values. For example, a request may indicate that a received field value is an IP address, a port, a user ID, and so on. The provided time period may be a single point in time (e.g., 1:00 PM on Mar. 15, 2014) or a time range. Time ranges may be open ended time ranges that specify just a start time or just an end time, or may be closed ended time ranges that specify both a start time and an end time. For example, a time period may be 1:00 PM to 5:00 PM on Mar. 15, 2014. Specified time periods may also be a particular day, a particular week, a particular month, and so on.

Responsive to user interface 175 receiving a request 435, event searcher 405 determines one or more queries to issue to the event data store 165 based on the request. The queries may include the time period and the field value or field values that were provided in the request. The query or queries may additionally include any other information that was provided in the request, such as the field type or specific field associated with the provided field value or field values.

If no field type or field identifier was provided with the field value, event searcher 405 may analyze the provided field value to determine one or more field types that might correspond to the field value. Event searcher 405 may determine the possible field types based on comparing a format of the field value to the formats of each of the possible field types. For any field type that has a format that matches the format of the provided field value, event searcher may identify a possible match. For example, if the field value was "192.168.0.1", then the event searcher might determine that the field value has an IP address field type.

In one embodiment, if the field type of the provided field value is known, then event searcher issues a query to a particular field type table 475 associated with the known field type using the field value as a key. The query additionally includes the time period indicated in the request from the user computing device. Events having one or more fields with that field type may be indexed in the field type table 475 based on the field values associated with those one or more fields. If the field type is unknown, then event searcher may issue a separate query on each of the field type tables 475 associated with field types having field value formats that match a format of the provided field value. Alternatively, event searcher 405 may issue queries to each of the field type tables 475.

Event searcher 405 receives responses 440 to the one or more queries that were issued to the event data store 165. The received responses 440 include one or more events 350 having a field that matches the queried field value and a time stamp that matches the queried time period. If the time period was a range, then the returned events would have a time stamp that falls within the range.

Context determiner 410 processes each of the events that are received in responses 440. To process an event, context determiner 410 determines a source type associated with that event. The source type may be indicated as metadata in the event. Alternatively, or additionally, a UUID of a data source object for a data source that generated the log entry that the event is based on may be included in the metadata for the event. The UUID may be used to determine the source type associated with the event. In one embodiment, the UUID is used as a pointer to a data source object. The UUID may be used in a query to the event data store 165 to retrieve information on the data source object 235 associated with the event, where the retrieved information includes the source type.

Once the source type associated with an event is determined, context determiner 410 determines one or more context definitions associated with that source type. The context definition(s) associated with a source type are included in configuration data as entries of the source type. A typical source type (and thus a typical event) will be associated with a single context definition. However, some source types may be associated with two or more context definitions. The source type also indicates field types associated with specific fields in the event. The source type may also indicate any additional transforms that were used to generate the event, and may include pointers to those additional transforms. The source type and/or transforms may then be used to determine the field types of each of the fields in the event.

A context definition is a list of fields that defines the fields to use for determination of an event's context. The context definition further defines the fields to use as link keys for events associated with a specific source type. In one embodiment, these fields are determinative of the information that will be gathered and presented in responses 442 to user computing devices 180.

Once the context definition associated with an event is determined, context determiner 410 may determine the event context for the event using the context definition. By adding an event context to an event, the context determiner 410 is encoding knowledge and meaning into a previously static log entry. The event context for an event may be a values list or dictionary of key value pairs that includes each of the fields specified in the context definition and the field values for those fields from the event. The event context represents a succinct summary of the information about the event that provides a particular logical meaning for the event. In other words, the context definition is usable to characterize a particular meaning for an event that it is applied to, and that particular meaning is represented in the event context. Information other than the fields specified in the context definition (e.g., information such as number of bytes that were transmitted, protocols used, which particular machine reported the event, etc.) may be disregarded for the determined event context, leaving behind a succinct meaning.

In an example, an identity context definition may be applied to an event to determine an identity context for that event, where the identity context associates a user to at least one of a device, a location or an alias. For example, the identity context may reveal particular users associated with virtual private network (VPN) logs, RADIUS logs, OpenID logs, OAuth authentication logs, and so on.

In another example, an endpoint context definition may be applied to an event to describe a particular device on a network or changes to a particular device. For example, an endpoint context may reveal particular devices from dynamic host configuration protocol (DHCP) acknowledgments, reboot records, software installation logs, storage attachment logs, and so on.

In another example, a network context definition may be applied to an event to describe traffic across a network. For example, a network context may reveal traffic information from network translation logs, firewall transit logs, and so on. In another example, an application context definition may be applied to an event to describe at least one of a service request or a service response associated with that event. In another example, a data context definition may be applied to an event to describe content of network traffic. For example, a data context may reveal interactions with services on a network based on data requests, web requests, and so on. In another example, a threat context definition may be applied to an event to describe a network threat detected by at least one of an intrusion detection system (IDS), a security event and information management (SIEM) system, a database, or a user behavior analytics (UBA) system. Other types of context definitions may be applied to events to determine other types of contexts.

A context definition additionally indicates a context type associated with the context definition. A non-exhaustive list of context types includes an identity context type, an endpoint context type, a network context type, an application context type, a data context type and a threat context type. Multiple different context definitions may be associated with the same context type.

Each event context has a context type based on the context type associated with the context definition used to generate that event context. The context determiner 410 compares a generated event context to the other event contexts having the same context type. Where matches are found between event contexts, the duplicate event contexts are dropped or deleted, and a count is maintained of the number of instances of that event context that were identified. Two event contexts may be determine to match if those event contexts have matching fields and matching field values. In some instances, partial matches between event contexts may also be determined. For example, a partial match may occur if two event contexts have multiple matching fields with matching field values, but also contain one or more non-matching fields and/or one or more non-matching field values. Because information (e.g., fields and field values) from events that are not relevant to a particular event context are not represented in that event context, the chances for event contexts for different events to match is significantly increased. This enables potentially thousands of different events to collapse into a handful of distinct event contexts.

In an example, identity event contexts may be determined for thousands of events. As a result, context determiner may end up with three distinct event contexts for three different users of a machine. A first identity event context may indicate that a first user (e.g., Bob) performed 400 different tasks on the machine in a particular time period. A second identity event context may indicate that a second user (e.g., Carol) performed 10 different tasks on the machine in the particular time period. A third identity event context may indicate that a third user (e.g., unidentifiable user) performed a single operation on the machine in the particular time period. The single operation performed by the unidentifiable user would ordinarily be buried in the information on the hundreds of tasks that were performed by Bob and Carol. However, by representing the events as event contexts, the actions of the unidentifiable user become apparent.

If multiple field values were provided by the user, event searcher 405 may issue different queries based on each of the provided field values. In such an instance, event searcher 405 may compare results from the different queries, and may keep the events that were returned as a result to each of the queries. Other events that were returned from less then all of the queries may be discarded. For example, if a first query for a first field value returned a first event and a second event, and a second query for a second field value returned the second event and a third event, then the first event and the third event would be discarded. Alternatively, a multi-value query may be issued to the event data store 165 that returns only those events that match each of the specified field values.

As previously indicated, the context definitions define the link keys to use to link together events. In one embodiment, event searcher 405 performs one or more recursive searches of the event data store 165 using the field values from fields of returned events that are specified in context definitions associated with those returned events. The context definition associated with an event is usable both to derive the context for that event and to determine the link keys to use for further searches. The specified fields in the event context represent both the fields to use for the further searches and the fields to use for generating the event context. These fields are the fields of an event that contain information that characterize that type of event. For example, in the instance of an event associated with network security, the context definition may specify the fields of IP addresses, MAC addresses, user identities and host names. Accordingly, event searcher 405 may use the generated event context of an event to perform one or more additional searches into the event data store 165. These additional searches are performed using search keys that were not specified in the request from the user computing device 180 and without any further search request from a user.

Each of the additional queries 438 on the event data store 165 made from field values of fields specified in the context definition and included in an event context returns responses 440 including additional events. Event contexts may be generated from each of these additional events. These event contexts may be combined with the originally determined event contexts. This may cause additional contextual information to be determined that was not determinable solely based on the original query.

In an example, an initial query may return some events showing a particular account name. One of those events may additionally indicate an account ID, and a context definition may specify the fields of account ID and account name. That account ID may be searched in a follow-up query. The information associated with both the account name and the account ID may then be determined. This information would not have been determined based solely on the initial query of the account name.

The combined use of assigned field types for indexing of events into the event data store and assigned context definitions that specify subsets of those field types to use as link keys for searching the event data store provides a flexible and changeable way to connect events for queries. This enables the connections between events to be determined on-the-fly during a query rather than at the time of database creation. As a result, a system designer does not need to predict what links might be important to users during database creation.

In a graph database, by contrast, each edge (connection between two objects) is labeled with a role that defines the relationship between objects permanently as part of the database. Accordingly, the link keys in a graph database and other databases are included as part of the schema of the database. As a result, a database designer needs to know how events will relate to one another a priori. If the database designer is wrong, then there is no easy way for such databases to find information linking events that a user might be looking for. A change to the link keys in such a database after the database has been populated with data can take upwards of a month to complete.

However, in embodiments described herein the link keys (and thus the relationships between events) are represented in context definitions in configuration data that is separate from the data store. The event data store (e.g., event database) itself does not include any information on how edges are labeled (e.g., on how events are to be linked). Moreover, the context definitions that define the link keys are changeable at any time, even after the data store has been populated with data. The link keys may be changed without making any modifications to the events that are stored in the event data store 165. The change can be implemented in embodiments in a manner of minutes.

Graph databases also generally form a graph from object to object. In contrast, embodiments described herein provide links between objects (events) and classes of objects (classes of events). This enables events to link to multiple different types of other events. For example, an event from a syslog entry may link to an event from a firewall log and an event from a DNS log.

Once the context determiner 410 has determined the event contexts for the events returned in the responses 440 from the initial query and any additional queries, response generator 415 generates a report that includes information from those event contexts. The report may indicate the activity that occurred around an alert that was initially investigated. In one embodiment, the response generator 415 distills the information from all of the events (e.g., which may be thousands of events) into a concise report that may be presented in one or a few pages. The concise report may include summaries of the number of instances of each event context. The concise report may additionally, or alternatively, identify specific event contexts that are most common, event contexts that are most relevant, event contexts that are unique, field values that are most common, field values that are unique, and so on. In embodiments, the report generated by the response generator 415 is designed to enable a user to quickly understand a situation surrounding an incident quickly and intuitively.

In one embodiment, the response generator 415 compares event contexts to identify field values that are the same across multiple different event contexts. For example, response generator 415 may determine that the same MAC address is included in many different event contexts, which may have the same context type or different context types. Response generator 415 may include a notification in the report that highlights the field value or field values that are common to multiple event contexts. Response generator 415 may also indicate, for example, a number of event contexts in which the field value was found. This may enable a user to easily see the common field values so that the user can further investigate those specific field values if so desired.

The report includes results to both the queried field values as well as results to queries of additional field values that were not queried by a user. These additional queries are queries on field values of fields that are specified in context definitions associated with the events returned from the initial query. Accordingly, additional useful contextual information is determined that is related to results of the initial query. All of these additional (e.g., recursive) searches are performed in an automated manner without any additional action on the part of the user to request such additional queries.

In an example, a user may initiate a first query on a username. Some of the events that are returned may mention both the username and a user ID, where the user ID is another way to identify the same user associated with the username by some systems that generated log entries. The event searcher 405 may perform an additional search on the user ID that was included in one or more of the initially returned events. This may cause additional events that are associated with the user ID to be returned. The events associated with the user ID may then be concatenated with the events associated with the username, which provides a greater detailed context surrounding the queried username. In this example, it was not known that the username and the user ID were mapped together prior to the search. The ECMS system was able to infer that the events associated with these different field values would map together.

The report generated by response generator 415 may include multiple different report sections. In one embodiment, the report includes a different report section for each context type reflected in the event contexts generated from the returned events. Each section may include a succinct summary of the event concepts having the context type of that section and may include the number of event contexts, highlights from the event contexts, lists of the event contexts, and so on. In one embodiment, each report section is represented as a table. For example, each section may include a separate entry for each unique event context, and may indicate for each event context the number of instances of that event context that were identified. Each report section may additionally indicate a most common event context or multiple most common event contexts of that context type, a most common field value or most common field values of the event contexts having that context type, and so on. Most common event contexts may be determined, for example, by determining a number of instances of multiple different event contexts, comparing the number of instances of these event contexts, and then selecting the event context having the most instances as the most common event context. By grouping the event context information based on context type, the efficiency of user investigations is improved.

The report provides a meaning for a collection of returned events based on distilling those events down into relevant contextual information and combining that contextual information based on context types. The report makes it very easy for a user to understand what all of the returned events represent. For example, the report may make it easy for a user to identify the particular user identities, endpoint identities, network traffic, transmitted data, reported threats, and so on at a glance. The report enables users to perform triage on alerts involving network security, network operations and/or application operations.

In an example, an alert may have initially been generated responsive to too many failed login attempts on an account. The report generated based on that alert may identify the number of failed login attempts, whether or not the login attempts originated from a new, unexpected source, whether or not the credentials have been updated recently, the number of recent successful login attempts, and so on. A report containing all of this contextual information enables a user to quickly make an informed decision about whether or not the alert represents a threat. If the user determines that the alert represents a threat, then they would additionally be able to ascertain from the report whether there was a successful login, and what activity was performed after the successful login.

The report may be used by a user to initiate further searches into the event data store 165 and/or to look up additional information about specific events. For example, a user may select (e.g., click on) a particular event context to view a list of the individual events that resolved to that event context. Responsive to the user selecting the event context, a new request 435 may be sent to user interface 175 for a list of the individual events. The response generator 415 may then return a summary of those events in a response 442. The user may then select any of those events from the summary (causing another request 435 to be sent to user interface 175), and the response generator 415 may return the selected event, including all of the information that was not included in the event context.

In another example, a user may request a follow-up query based on information provided in the report. Such a follow-up query is referred to herein as a chained query. A subquery may be issued from a report based on selecting one or more field values of one or more event contexts included in the report. This may initiate a repeat of the above described operations, and may result in a new report that is sent to the user computing device. The new report may include attribution to the event context and/or field values that were used to initiate the subquery. A user may continue to issue further subqueries based on information from reports, creating a linked chain of queries.

Many different types of events are stored in event data store 165, and those many types of events may have many different formats. In one embodiment, the events are annotated versions of original log entries that preserve the original formatting and structure of those original log entries. Accordingly, the events in event data store 165 are not uniform or homogenous. In contrast, SIEM systems normalize log entries so that all log entries have the same final normalized format. This normalization process destroys the original formatting of the log entries, and can make the log entries more difficult to understand. For example, if a log entry has a concept of a destination IP, the SIEM system might translate that destination IP to a normalized name.

Since the original formatting and structure of the log entries is maintained in the events, the events that are returned to users have the same format that these users will be accustomed to. Accordingly, users can review and understand the data in the events without any additional learning curve. This can improve the efficiency of using the ECMS system.

As previously mentioned, service interface 178 performs similar operations to those of user interface 175. For example, event searcher 420 receives requests from third party services 185. The requests may be received via HTTP or via other protocols such as extensible markup language-remote procedure call (ML-RPC), simple object access protocol (SOAP), advanced message queuing protocol (AMQP), simple/streaming text oriented messaging protocol (STOMP), and so on. A received request may include one or more field values, one or more field types associated with those field values, and/or a time period. Additionally a request may include a content request asking for particular data that the third party service 185 is searching for.

In an example, the third party service 185 may generate requests asking for specific information during evaluation of log entries to determine a threat posed by events reflected in those log entries. In many instances the third party service 185 may have insufficient information to properly determine whether certain activity represents a threat. Such third party systems may determine what additional information is needed to make such an assessment, and may request that additional information from the ECMS via the service interface 178.

Event searcher 420 performs similar operations as described with reference to event searcher 405, including generating queries 448 and sending them to event data store 165. Similarly, context determiner 425 performs similar operations to those of context determiner 410, such as receiving the events from responses 450 and determining the event context from such events.

Response generator 430 may generate a report based on the event contexts of the returned events. In some instances, the response generator 430 then generates a response 452 that includes the report, and sends the response to third party service 185. However, in many cases the third party service 185 may want an answer to a specific question rather than a full report. In such an embodiment, response generator 430 may then extract information from the report that will answer the specific question that the third party service 185 is interested in. More specifically, response generator 430 may determine a subset of information (referred to simply as content) from the report that is responsive to the content request included in the original request 445 from the third party service 185. Response generator 430 may then generate a response 452 that includes the content that is responsive to the content request and send that response 452 to the third party service 185.

Third party services 185 may issue many different types of content requests. Content requests may be requests for information associated with a particular context type, information associated with specific fields, information associated with only particular types of events, most common event contexts, most relevant event contexts, and so on. One example content request is a request to identify a particular user or a particular device. Responsive to a request to identify a particular user, response generator 430 may determine event contexts that are associated with an identity context type, and provide those event contexts in the response. Alternatively, response generator 430 may determine a most common identity event context or a most relevant identity event context and return just that event context in the response 452.

Responsive to a request to identify a particular device, response generator 430 may determine event contexts that are associated with an endpoint context type, and provide those event contexts in the response. Alternatively, response generator 430 may determine a most common endpoint event context or a most relevant endpoint event context and return just that event context in the response 452.

In another example, the third party service 185 may issue a request 445 asking for all of the information that can be determined about a particular machine or individual. From the generated report, the response generator 430 could return a response indicating the identities of all individuals that used the machine, IP addresses that the machine was assigned in a particular period, incoming and outgoing messages from the machine, and so on. This information could then be sent to third party service 185 in a response 452 that is formatted as a machine consumable result.

In another example, a third party service 185 may issue a request for the most relevant event context (or most relevant event contexts) returned by a particular query. To determine a most relevant event context, response generator 430 may determine a set of most common event contexts. From the set of most common event contexts, response generator 430 may then compare the time stamps (start and/or end times) associated with each of these event contexts. Response generator 430 then determines that the event context that is a most common event context that is closest in time to an initial queried time period (e.g., a specified point in time or time range).

In one embodiment, response generator determines a threshold distance in time from the initial queried time period (e.g., 1 hour from the queried time period, 30 minutes from the queried time period, 10 minutes from the queried time period, 1 day from the queried time period, etc.). In one embodiment, only those event contexts having a time stamp that are within the threshold distance in time are considered for the most relevant event context.

In one embodiment, a third party service 185 may issue a request that includes a log entry. The request may additionally specify a source type of the log entry. Alternatively, event searcher 420 may analyze the provided log entry to determine a source type associated with that log entry. Once the source type is determined, event searcher 420 may invoke a parser to parse the log entry to identify fields and field values of the log entry. Once the fields and field values are determined, the parser may determine field types to assign to specific fields of the log entry based on the associated source type. Event searcher 420 may determine a context definition associated with the log entry based on the associated source type, and may then issue one or more queries 448 using the field values of the fields specified in the context definition. The subsequent steps that are performed correspond to the previously described steps performed by user interface 175, and include determining event contexts of returned events, issuing one or more recursive searches using the field values of returned events, generating a report based on the event contexts, and returning at least a portion of the report in a response 452 to the third party service 185.

Third party services 185 may expect results to be returned in a specified format. In one embodiment, each third party service is treated as a data source. Accordingly, the ECMS may generate a data source object 235 for a third party service 185, and that data source object may specify a source type associated with that third party service. The source type associated with a third party service may specify the format to use for responses to the third party service 185. Accordingly, response generator 430 may determine a source type associated with the third party service 185 that a request is received from based on, for example, an IP address, a port number, and/or other information identifying the source of the request and/or how the request was received.

Once the source type associated with a third party service 185 is determined, response generator 430 may determine the format to be used for responses 452 to that third party service 185. For example, the source type may indicate that responses are to be provided as PDF documents, a CSV files, a HTML documents, as email messages, as text messages, and so on. The source type may also specify specific fields to include in the response, locations of those fields in the response, headers to use, a communication protocol to use for sending the response 452, and so on. Response generator 430 formats the response according to the determined format, and sends the response 452 to the third party service 185.

FIG. 5 is a block diagram of sample configuration data 238 for an event context management system. The configuration data 238 may be one or more configuration files, a configuration service, a configuration store, a configuration database, or other arrangement of configuration data. In the example of a configuration service, components off the ECMS may query the configuration service for configuration information such as data source information, source type information, context definitions, field type information, and so on. Alternatively, components of the ECMS may query the configuration service for a complete copy of the configuration data, and may store that copy of the configuration data locally. In one embodiment, no configuration service is implemented, and a copy of the configuration data 238 is stored at each component of the ECMS. In some embodiments, all components of the ECMS contain copies of the same configuration data. Alternatively, different components of the ECMS may contain configuration data with different information. For example, a listener 120 may contain just the portions of configuration data that are relevant to the listener 120, while the indexer 150 may contain just the portions of the configuration data that are relevant to the indexer 150.

In one embodiment, the configuration data 238 is implemented as one or more text files having a basic structure composed of sections, properties and values. In one embodiment, the configuration data 238 is implemented as one or more INI files. Alternatively, the configuration data 238 may be implemented as one or more extensible markup language (XML) files, Javascript object notation (JSON) files, YAML files, comma separated values (CSV) files, or other types of configuration files.

Another example network context definition may specify the fields of source IP address, destination IP address, network address translation (NAT) source IP address, NAT destination IP address, and a rule name.

In one embodiment, configuration data 238 includes entries for source types 535 and entries for context definitions 540, 545, 550, 555, 560, 565. Configuration data 238 may also include many other types of information, such as locations of the data lake and event data store, locations of the listener and indexer, and so on.

As shown an example source type 535 may include a title, which may indicate a class of data source, such as a Palo Alto Networks® firewall, an InfoBox® DNS firewall, a particular type of DNS server, and so on. A source type 535 may additionally include source identifying metadata, which may include parameters such as IP addresses, port values, URLs, file names, directory names, host names, and so forth. The source identifying information may be used by listeners to determine what source type to assign to a data source based on the source identifying metadata associated with that data source.

A source type 535 may additionally include information on a log format associated with that source type. The log format information may be used to perform operations such as breaking event data into discrete log entries, parsing discrete log entries, determining additional transforms to use to further parse discrete log entries, and so on.

The log format in a source type will indicate each of the fields included in that log format. A source type 535 may additionally include information on fields of that log format that are to be assigned specific source types as well as the specific field types to assign to those fields. For example, fields may be assigned field types such as "IP address", "port", "user ID", "host ID", and so on. The fields that are assigned field types will be used to index events associated with a particular source type into the event data store.

A source type 535 may additionally include one or more context definitions. A source type 535 may include a complete context definition, including a specification of each field that is to be used as a link key to link together events. Alternatively, a source type 535 may include a context definition ID, and the context definition may be specified elsewhere in the configuration data 238. This may enable multiple different source types to reference the same context definitions without containing multiple copies of those context definitions in the configuration data.

Configuration data 238 may contain multiple different context definitions 540-565, which may be grouped according to context type 505, 510, 515, 520, 525, 530. A context type is a class of context (e.g., data context, application context, threat context, etc.), and the context definitions 540-565 represent particular instances of a particular context type. A non-exhaustive list of context types includes an identity context type 505, an endpoint context type 510, a network context type 515, an application context type 520, a data context type 525 and a threat context type 530. Each context type may include multiple different context definitions. For example, identity context type 505 includes multiple identity context definitions 540, endpoint context type 510 includes multiple endpoint context definitions 545, network context type 515 includes multiple network context definitions 550, application context type 520 includes multiple application context definitions 555, data context type includes multiple data context definitions 560, and threat context type 530 includes multiple threat context definitions 565.

Identity context definitions 540 identify who the persons and/or machines are that are involved in events. Each identity context definition 540 is usable to associate users to at least one of devices, locations or aliases. Identity context definitions 540 will generally include specified fields of a user field, an internet protocol (IP) address field and a media access control (MAC) address field. Some identity context definitions 540 will include a source IP address and a destination IP address, a source NAT IP address, a destination NAT IP address, and/or other fields.

Each endpoint context definition 545 is usable to describe a device on a network. Information that describes the device may include information on software running on the device, a state of the device, a device type, and/or other asset information about the device. Endpoint context definitions 545 will generally include an IP address field and a host field, and may additionally include other fields.

Each network context definition 550 is usable to describe traffic across a network. The network context definition 550 may identify a network zone, a physical location, a geolocation of devices sending and receiving traffic, and so on. Network context definitions 550 will generally include at least a source IP address field, a destination IP address field and a port field.

Each application context definition 555 is usable to describe at least one of a service request or a service response. The application context definitions 555 provide, for example, information on services and applications that are being accessed from machines on a network. Application context definitions 555 will generally include at least an IP address field and a host field.

Each data context definition 560 is usable to describe content of network traffic. Data context definitions 560 describe, for example, a type of data and a volume of data that is transmitted on the network. Data context definitions 560 typically include at least a transmitted bytes field, a data encoding field and a data characterization field.

Each threat context definition 565 is usable to describe a network threat detected by a threat detector. Examples of threat detectors include an intrusion detection system (IDS), a security event and information management (SIEM) system, a user behavior analytics (UBA) system, an endpoint monitor that monitors suspicious files and processes (e.g., a malware or antivirus detection system), a configuration compliance scanner, a vulnerability scanner, and so on.

FIGS. 6-15 are flow diagrams showing various methods performed by an ECMS system to receive log data, generate and store events, and search events. The methods may be performed by a processing logic that may comprise hardware (e.g., circuitry, dedicated logic, programmable logic, microcode, etc.), software (e.g., instructions run on a processing device to perform hardware simulation), or a combination thereof. Various embodiments may be performed by one or more computing devices that make up an ECMS (e.g., computing devices executing a listener 120, a data lake 130, an indexer 150, an event data store 165, a user interface 175 and/or a service interface 178).

Figure 6:
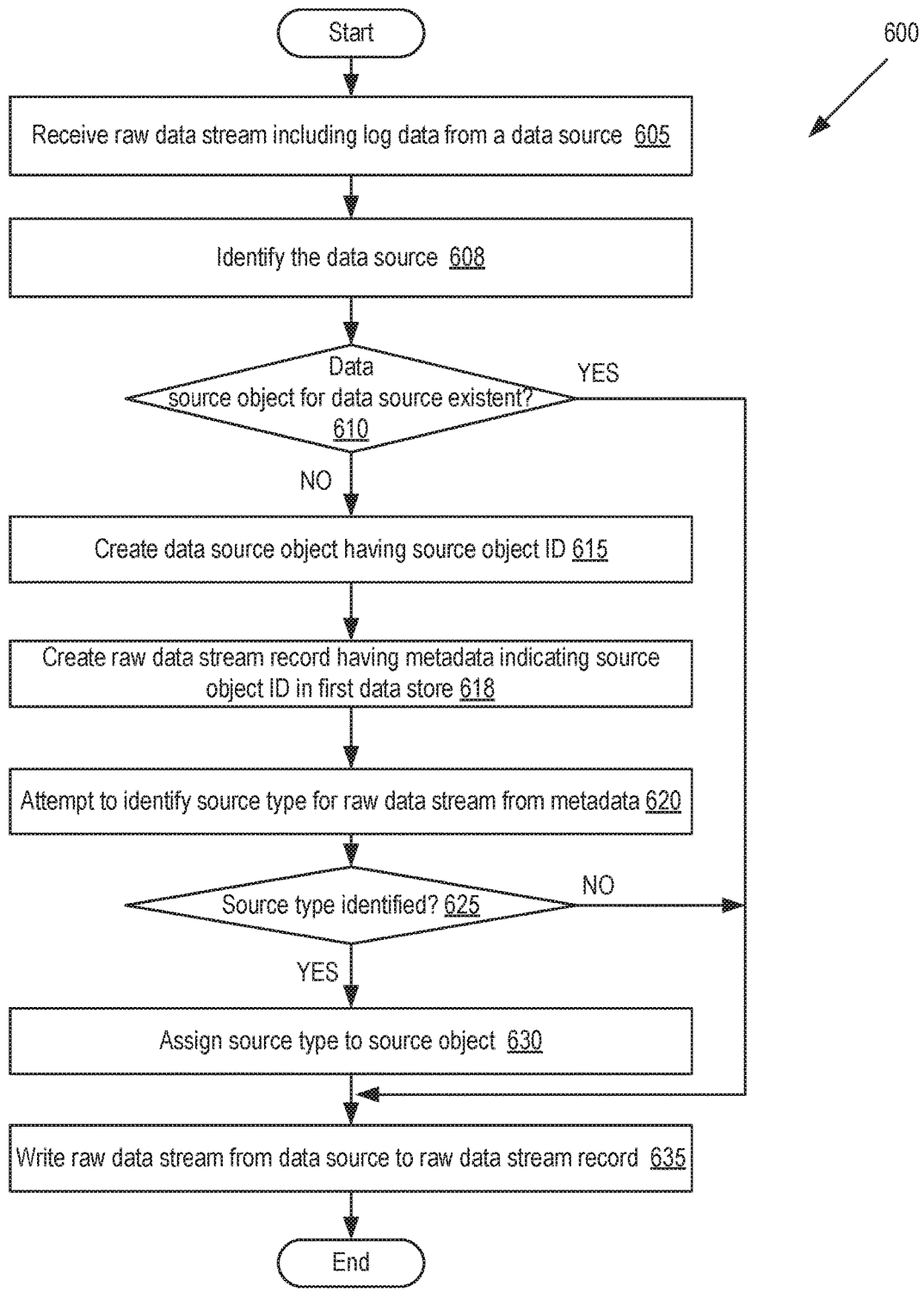
FIG. 6 is a flow chart of one embodiment for a method of storing a raw data stream of log data into a data store.

FIG. 6 is a flow chart of one embodiment for a method 600 of storing a raw data stream of log data into a data store. In one embodiment, method 600 is implemented by a listener (e.g., listener 120 of FIG. 2) executing on a computing device. The raw data stream may correspond to raw data stream 210 of FIG. 2 and the data store may correspond to data lake 130 of FIGS. 1-2. At block 605 of method 600, processing logic receives a raw data stream including log data from a data source.

At block 608, processing logic identifies the data source that sent the raw data stream. The data source may be identified based on how the raw data stream arrived at the processing device (e.g., whether a push or pull data transfer model was used, whether the raw data stream was retrieved by accessing a URL, a port at which the raw data stream was received, a protocol used to transmit the raw data stream, etc.) and the sender of the raw data stream (e.g., identification of an agent executing on a remote device that sent the raw data stream, an IP address of a remote device, and so on).

At block 610, processing logic determines whether a data source object associated with the identified data source is existent. This may include querying a data store such as an event data store that contains data source objects. If a data source object exists for the data source, the method proceeds to block 635. If a data source object has not yet been created for the data source, the method continues to block 615.

At block 615, processing logic creates a data source object. In one embodiment, the data source object is created by issuing a command to create the data source object to a database management system (DBMS) that manages a data store that stores data source objects (e.g., to an event data store). A data source object ID (e.g., a UUID) may be assigned to the new data source and may be returned to the processing logic.

At block 618, processing logic creates a raw data stream record for the raw data stream from the data source. The raw data stream record may include metadata (e.g., a title) indicating the source object ID of the data source object created for the data source. For example, the raw data stream record may be labeled as "UUID-raw".

At block 620, processing logic attempts to identify a source type for the raw data stream from metadata associated with the raw data stream and/or the data source. For example, the same data that was used to uniquely identify the data source may also be used to determine a source type of that data source. This determination may be made by comparing the metadata with one or more source type entries included in configuration data.

At block 625, processing logic determines whether the source type was identified for the raw data stream. If the source type was identified, the method continues to block 630. Otherwise the method proceeds to block 635.

At block 630, processing logic assigns the determined source type to the data source object created for the data source that the raw data stream was received from. This may include sending a message to a data store that contains the data source object to cause the data source object to be updated in the data store. At block 635, processing logic writes the raw data stream from the data source to the raw data stream record. This may include breaking the raw data stream up into multiple blocks (e.g., 10 kb blocks), tagging the raw data stream (or the blocks) with a time stamp and/or other value (e.g., a sequence number) usable to order the entries in the raw data stream record, and/or tagging the raw data stream (or blocks) with a source type and/or source object ID. In one embodiment, writing the raw data stream into the raw data stream record included sending an instruction to a data store interface (e.g., a DBMS) to cause the data store interface to write the raw data stream to the data stream record.

Figure 7:
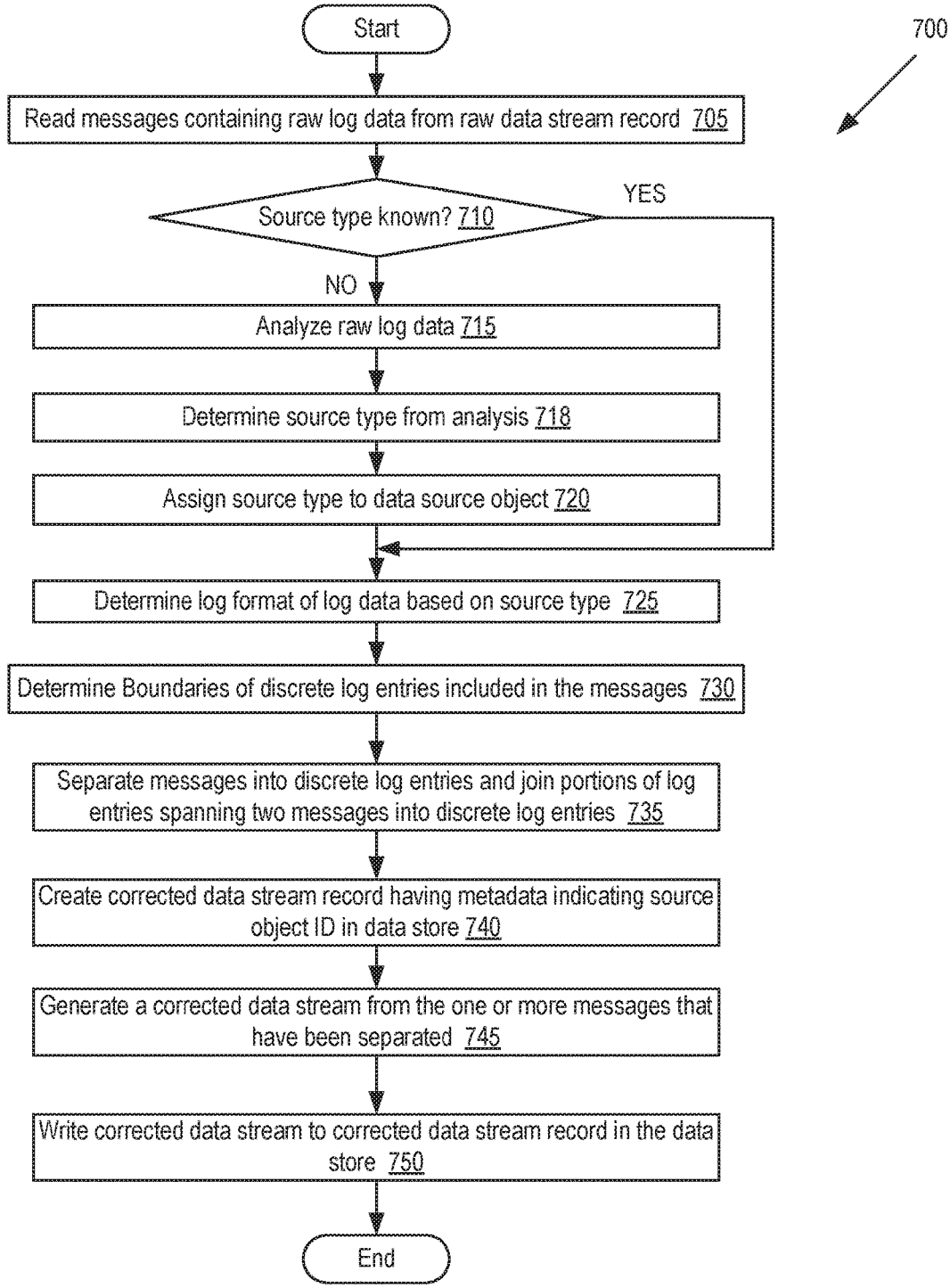
FIG. 7 is a flow chart of one embodiment for a method of generating a corrected data stream from a raw data stream and storing the corrected data stream in a data store.

FIG. 7 is a flow chart of one embodiment for a method 700 of generating a corrected data stream from a raw data stream and storing the corrected data stream in a data store. In one embodiment, method 700 is performed by an indexer (e.g., indexer 150 of FIG. 3) executing on a processing device. At block 705 of method 700, processing logic reads log data from a raw data stream record. This may include reading one or more messages and/or blocks containing log data from the raw data stream record.

At block 710, processing logic determines whether a source type is known for the log data. In some instances, the source type may be indicated in the log data itself (e.g., the log data may have been tagged with the source type by a listener). Alternatively, or additionally, the log data may have been tagged with a source object ID (or a label from which a source object ID can be determined). In such an embodiment, the processing logic may determine the source type from the source object ID (e.g., by issuing a query to a data store that contains the source object). If the source type is known, the method proceeds to block 725. If the source object is not known, the method continues to block 715.

At block 715, processing logic analyzes the raw log data from the raw data stream record. This may include analyzing the log data to identify fields in the log data, to identify a data type (e.g., whether the data is formatted in an XML format, a CSV format, etc.), and/or to identify other information about the raw log data. The determined information may then be compared against the data formats defined in multiple different source types. At block 718, processing logic determines a source type from the analysis. If a match is found between the determined information and the data format of a source type, then the log data may be identified as being associated with that source type.

At block 720, processing logic then assigns the identified source type to the data source object. In one embodiment, processing logic issues a command to a data store that stores the data source object to cause that data store to add the source type to the data source object.

At block 725, processing logic determines a log format of the log data in the messages and/or blocks from the raw data stream record based on the source type associated with that log data. This may include performing a lookup in configuration data that includes the source type. The source type may indicate the format of log entries associated with that source type.

At block 730, processing logic determines boundaries of discrete log entries included in the messages or blocks from the raw data stream record. At block 735, processing logic separates the messages or blocks into discrete log entries based on the determined boundaries. Additionally, processing logic may join together portions of log entries from adjoining messages or blocks. For example, a log entry may span multiple messages, in which a start of the log entry may be at the end of a first message and the end of the log entry may be at the beginning of a second message. Such a log entry may be recreated from the two log entry portions.

At block 740, processing logic creates a corrected data stream record for the discrete log entries. Alternatively, a corrected data stream record may already have been created for the discrete log entries from a particular source. The corrected data stream record may include metadata that indicates the source object ID of the data source that originated the discrete log entries and/or a source type associated with that data source.

At block 745, processing logic generates a corrected data stream from the separated messages. The corrected data stream includes the discrete log entries. At block 750, processing logic then writes the corrected data stream to the corrected data stream record in the data store.

Figure 8:
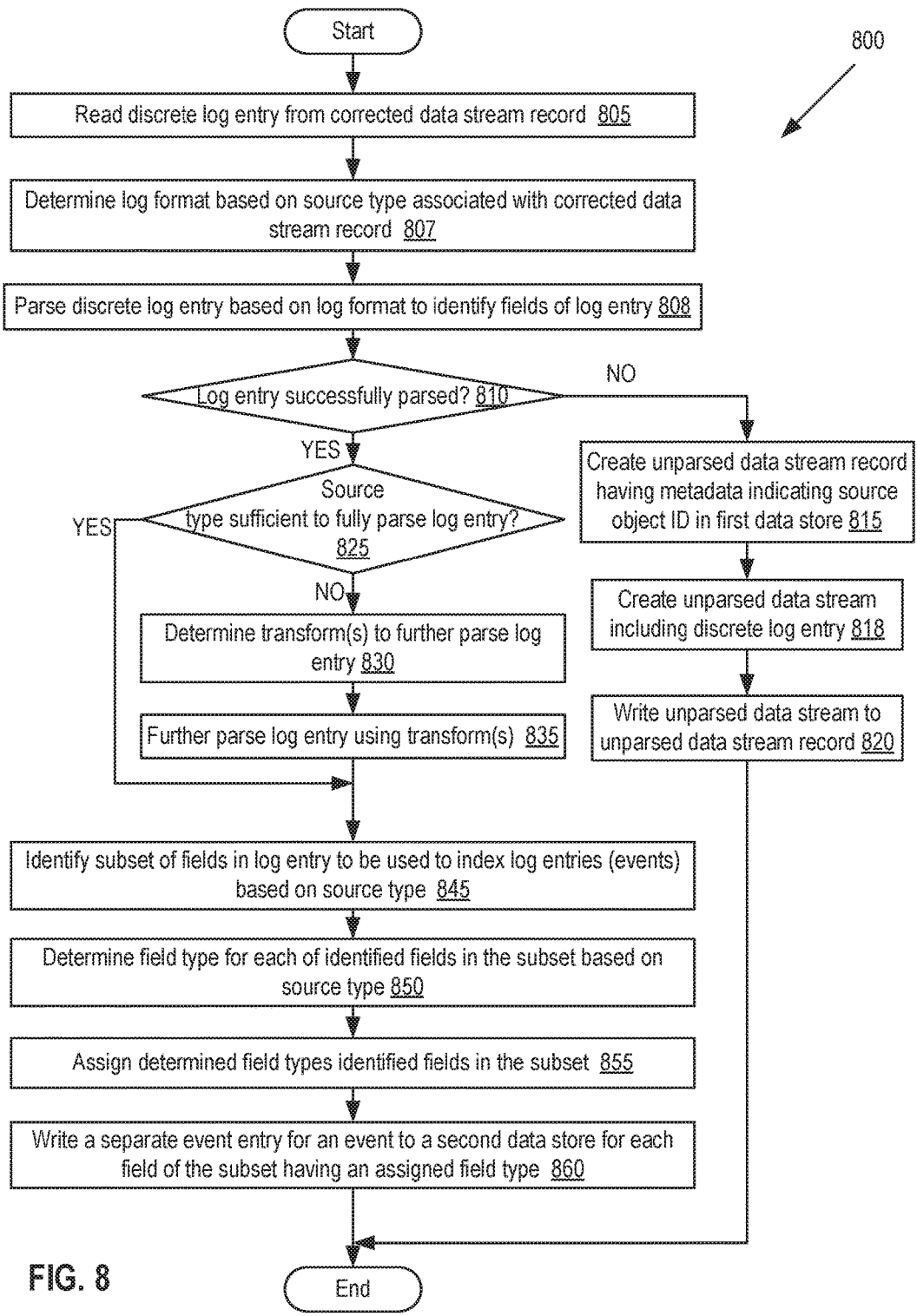
FIG. 8 is a flow chart of one embodiment for a method of generating events from discrete log entries in a first data store and storing the events in a second data store.

FIG. 8 is a flow chart of one embodiment for a method 800 of generating events from discrete log entries in a first data store and storing the events in a second data store. In one embodiment, method 800 is performed by an indexer (e.g., indexer 150 of FIG. 3) running on a processing device. At block 805 of method 800, processing logic reads a discrete log entry from a corrected data stream record in a data store (e.g., in a data lake).

At block 807, processing logic determines a log format of the discrete log entry based on a source type associated with the corrected data stream record from which the discrete log entry was read. At block 808, processing logic parses the discrete log entry based on the log format of the discrete log entry. By parsing the discrete log entry, processing logic is able to identify each of the fields in the discrete log entry and the field values of those fields.

At block 810, processing logic determines whether the discrete log entry has been successfully parsed. If the discrete log entry has not been successfully parsed, the method proceeds to block 815. If the discrete log entry has been successfully parsed, the method continues to block 825. In one embodiment, the operations of block 810 are performed after block 835 rather than after block 808. Alternatively, the operations of block 810 may be performed both after block 810 and after block 835.

At block 815, processing logic creates an unparsed data stream record having metadata (e.g., a label) indicating a source object ID of the data source object that generated the log entry in a first data store. Alternatively, the unparsed data stream record may have previously been generated. In one embodiment, the unparsed data stream record has a label of "UUID-unparsed", where UUID is the UUID assigned to the data source object generated for the data source object from which the log entry was initially received.

At block 818, processing logic creates an unparsed data stream that includes the discrete log entry that was not successfully parsed. The unparsed data stream may additionally include other log entries from a particular data source that were not successfully parsed. At block 820, processing logic writes the unparsed data stream to the unparsed data stream record.

In some instances, the source type alone is insufficient to fully parse the discrete log entry. At block 825, processing logic determines whether the discrete log entry is fully parsable using the source type. If the log entry is fully parsable from the source type, the method proceeds to block 845. If the discrete log entry is not fully parsable from the source type, the method continues to block 830.

At block 830, processing logic determines one or more additional transforms that are usable to further parse the discrete log entry. At block 835, processing logic further parses the discrete log entry using the identified transform or transforms. In some instances particular transforms may refer to still additional transforms. Accordingly, multiple layers of transforms may be used to fully parse a log entry.

At block 845, processing logic identifies a subset of the fields. The identified subset of fields will be used to index an event generated from the discrete log entry into a second data store (e.g., into an event database). Additionally, the subset of fields may later be used as link keys to link together events during searches.

At block 850, processing logic determines a field type of each of the identified fields in the subset. The field types to be assigned to the fields in the subset are identified in the source type. Accordingly, the source type may be used to determine the field types to assign to those fields. At block 855, processing logic assigns the determined field types to the fields in the subset.

In some embodiments, processing logic generates an event for the discrete log entry. The event may include the original text and/or other data from the discrete log entry. Additionally, the event may include a dictionary or list of key value pairs, where the keys correspond to fields and the values correspond to field values. In one embodiment, the dictionary or list of key value pairs includes just the fields that have been assigned field types. Alternatively, the dictionary or list may include all of the fields in the event, or a portion of the fields that is greater than the subset that has been assigned field types.

At block 860, processing logic writes the event to the second data store (e.g., to an event database). In some embodiments, processing logic writes multiple entries or copies of the event into the second data store. In one embodiment, processing logic writes a separate entry of the event into the second data store for each field that has been assigned a field type. Additionally, one or more entries of the event may be written into the second data store for each partitioned time period associated with the event. For each instance off the event that is written to the second data store, that instance may be indexed using the field value of one of the fields that has an assigned field type. The assigned field type may dictate a particular table or tables in the second data store that a particular instance of the event is indexed in.

Figure 9:
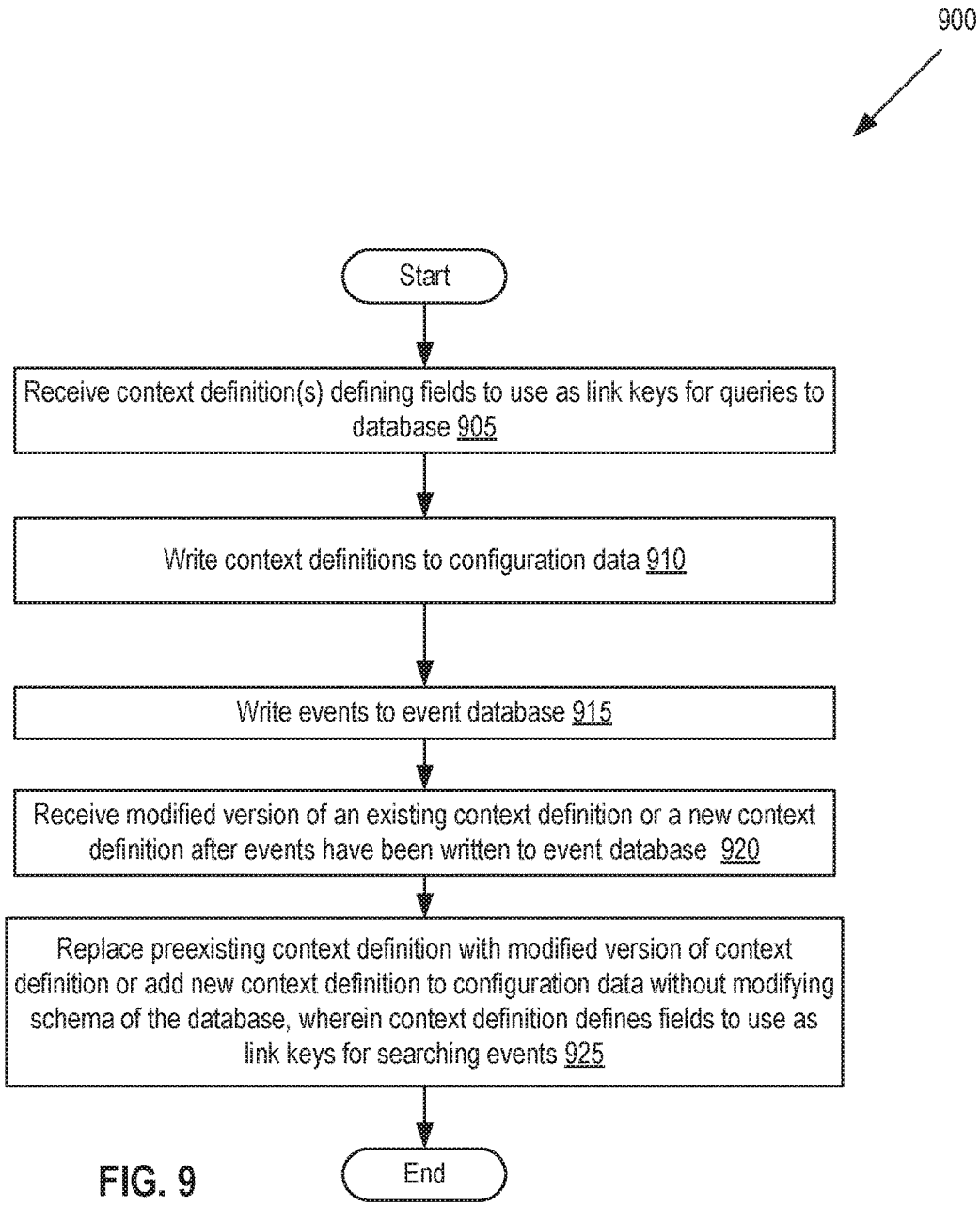
FIG. 9 is a flow chart of one embodiment for a method of storing context definitions in configuration data for an event context management system.

FIG. 9 is a flow chart of one embodiment for a method 900 of storing context definitions in configuration data for an event context management system. In one embodiment, at least some operations of method 900 are performed by a user interface (e.g., user interface 175) and/or service interface executing on a processing device. Operations may also be performed by other components of an ECMS.

At block 905 of method 900, processing logic receives one or more context definitions. The context definitions may be constructed by a user using a graphical user interface presented to the user. For example, the user may select a particular source type, which may cause a set of fields to be displayed. The user may select one or more of those fields to be used for a new context definition. Additionally, the user interface may present a list of available context types, and the user may select a particular context type to create a new context definition for.

In another embodiment, a user or service may generate a context definition offline, where the context definition includes a source type, a context type and a list of specified field values. A user computing device or service computing device may then transmit the context definition to processing logic.

At block 910, processing logic writes the received context definition (or multiple received context definitions) into configuration data. At block 915, the configuration data is written to a configuration data service or configuration data store. The configuration data (or portions of the configuration data) may be propagated to each of the systems in an ECMS. These systems (e.g., a listener, an indexer, a data lake, an event database, etc.) may restart, and upon restarting may implement an updated configuration as represented in the configuration data. For example, after being reset the systems would be able to process events using a new context definition. Similar changes may be made to update service types, add new service types, modify existing context definitions, add new context types, and so on.

At block 915, processing logic writes events to an event database as described herein above. These events may be written to the event database based on current configuration data. At block 920, processing logic receives a modified version of an existing context definition. Alternatively, or additionally, processing logic may receive a new context definition. The new or modified context definition is received after events have been written to the event database.

At block 925, processing logic replaces a preexisting context definition with the modified version of the context definition and/or adds the new context definition to the configuration data. The configuration data is separate and distinct from a schema of the event database. Accordingly, the configuration data may be modified (e.g., the context definitions may be changed) in the configuration data without modifying a schema of the event database. The components of the ECMS may be reset, and may then implement the updated configuration data. New searches that are performed after the reset may apply the new or modified context definition.

Context definitions define fields to use as link keys for searching events. Accordingly, the link keys or connections between events may be modified at any time merely by updating the configuration data, and without updating a schema of the event database. This makes the event database very flexible, and provides users with an ability to change how events are linked in searches at any time without imposing time consuming updates to the event database.

Figure 10:
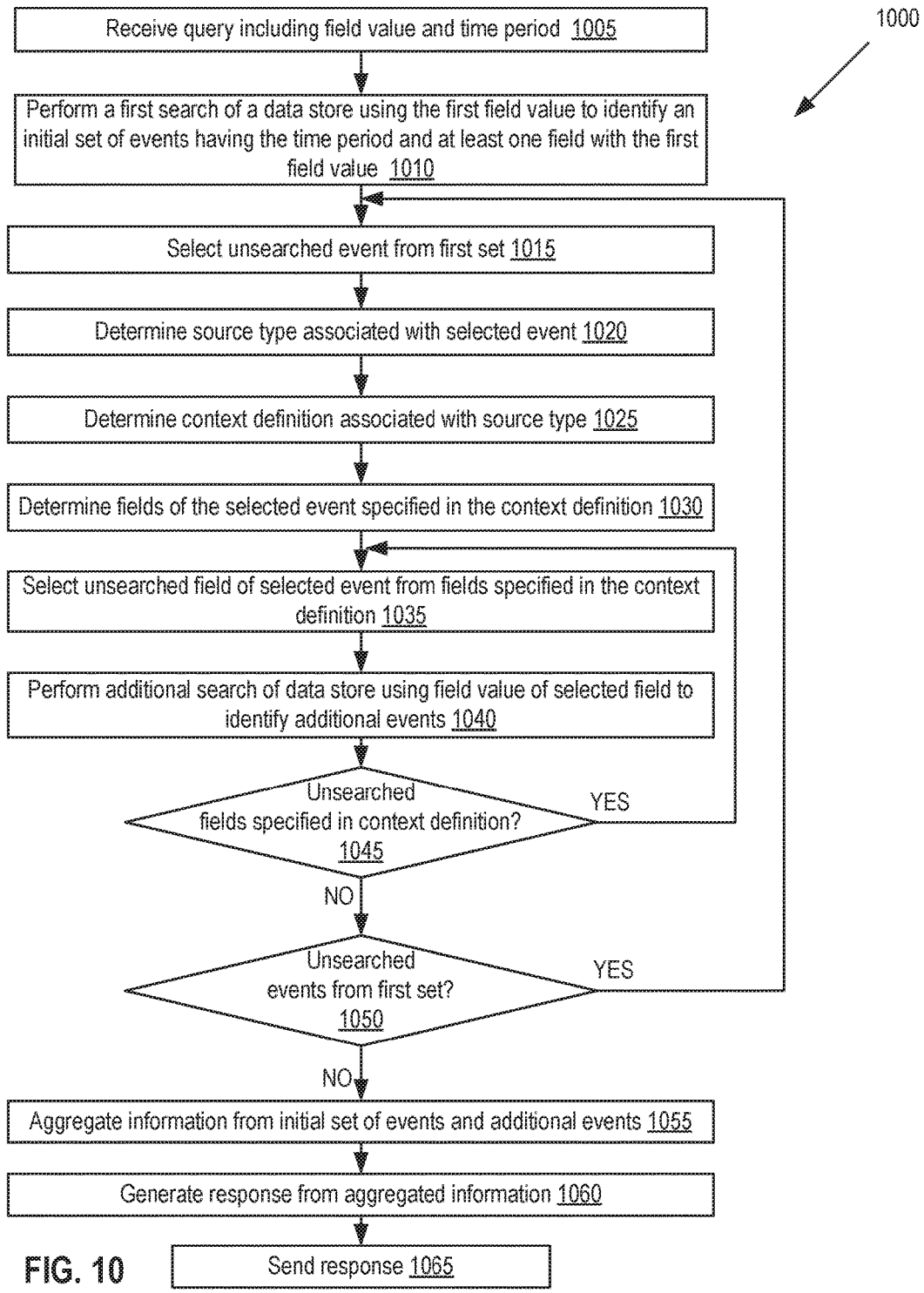
FIG. 10 is a flow chart of one embodiment for a method of performing a recursive search of events in a data store based on fields defined in one or more context definitions.

FIG. 10 is a flow chart of one embodiment for a method 1000 of performing a recursive search of events in a data store based on fields defined in one or more context definitions. Method 1000 may be performed by a processing device executing a user interface and/or a service interface (e.g., user interface 175 and/or service interface 178 of FIG. 4).

In one embodiment, at block 1005 of method 1000 processing logic receives a query including a field value and a time period. The query may additionally specify a field type associated with the received field value. The query may be received by a user interface (e.g., a web server) from a user or by a service interface (e.g., a web server) from a third party service.

At block 1010, processing logic performs a first search of a data store (e.g., of an event database) using the first field value. The first search returns results that include an initial set of events having the provided time period and at least one field having the provided field value.

At block 1015, processing logic selects an unsearched event from the initial set of events that were returned by the first search. At block 1020, processing logic determines a source type associated with the selected event. The source type may be indicated in the event. Alternatively, the event may indicate a data source ID, and the data source ID may be used to look up the source type.

At block 1025, processing logic determines a context definition associated with the source type. Some source types might be associated with multiple context definitions. For such source types, each of the context definitions may be determined.

At block 1030, processing logic determines fields of the event that are specified in the determined context definition. At block 1035, processing logic selects an unsearched field of the selected event from the fields specified in the context definition. At block 1040, processing logic performs an additional search of the data store using the field value of the selected field to identify additional events.

At block 1045, processing logic determines whether there are any fields of the event that are specified in the context definition (or multiple context definitions) and that have not yet been searched. If such unsearched fields are identified, the method returns to block 1035, and one of the unsearched fields is selected. An additional search is then performed on the field value of the newly selected unsearched field at block 1040. The additional search returns additional events that may or may not have been included in the initial set of events. This loop continues until additional searches have been performed for all specified fields off all determined context definitions associated with the source type.

If at block 1045 a determination is made that all fields specified in the context definition (or multiple context definitions) have been searched, processing logic continues to block 1050. At block 1050, processing logic determines whether there are any unsearched events from the initial set of events that have not been used to perform additional searches. If any such unsearched events are identified, the method returns to block 1050 and a new unsearched event is selected. If searches have been performed using all of the events in the initial set, the method continues to block 1055.

At block 1055, processing logic aggregates information from the initial set of events returned from the initial search and the additional events returned from the additional searches. This may include creating a report that includes event contexts based on these events. At block 1060, processing logic generates a response that includes the aggregated information. At block 1065, processing logic sends the response to the client from which the initial query or request was received (e.g., to the user device of a user or service computing device executing a third party service). The method then ends.

Figure 11:
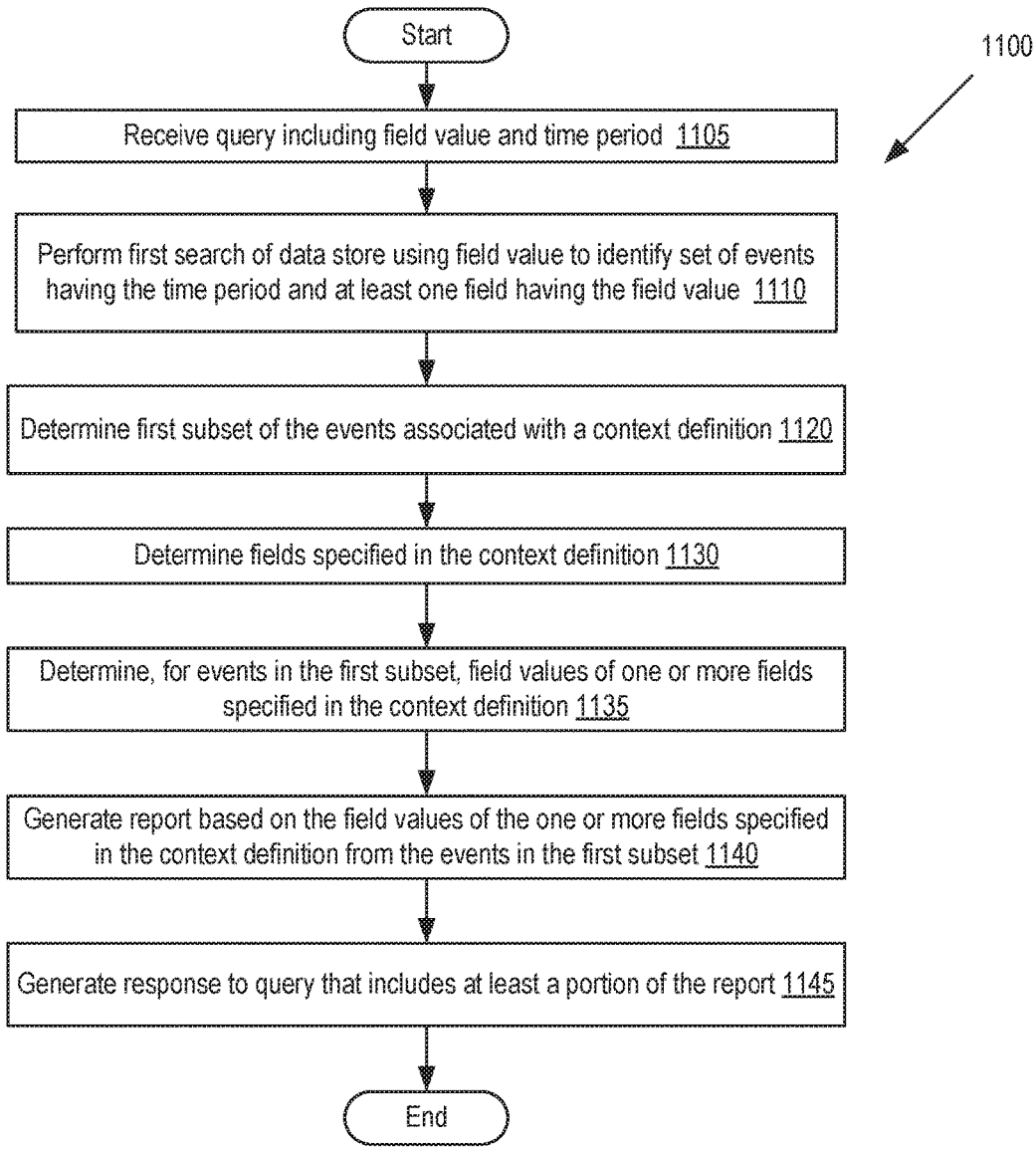
FIG. 11 is a flow chart of one embodiment for a method of searching events in a data store based on fields specified in a context definition.

FIG. 11 is a flow chart of one embodiment for a method 1100 of searching events in a data store based on fields specified in a context definition. Method 1100 may be performed, for example, by a computing device executing a user interface and/or a service interface.

At block 1105 of method 1100 processing logic receives a query including a field value and a time period. The query may also indicate a field type associated with the field value. At block 1110, processing logic performs a first search of a data store using the provided field value to identify a set of events having the time period and at least one field with the field value.

At block 1120, processing logic determines a first subset of the events that are associated with a context definition. At block 1130, processing logic determines fields that are specified by the context definition. At block 1135, processing logic determines, for events in the first subset, field values of one or more fields specified in the context definition. At block 1140, processing logic generates a report based on the field values of the one or more fields specified in the context definition from the events in the first subset. In one embodiment, processing logic determines event contexts for each of the events, wherein the event contexts are based on the field values of fields specified in the context definition. Processing logic may then group information in the report based on the context definition and the event contexts. At block 1145, processing logic generates a response to the query that includes at least a portion of the report.

Figure 12A:
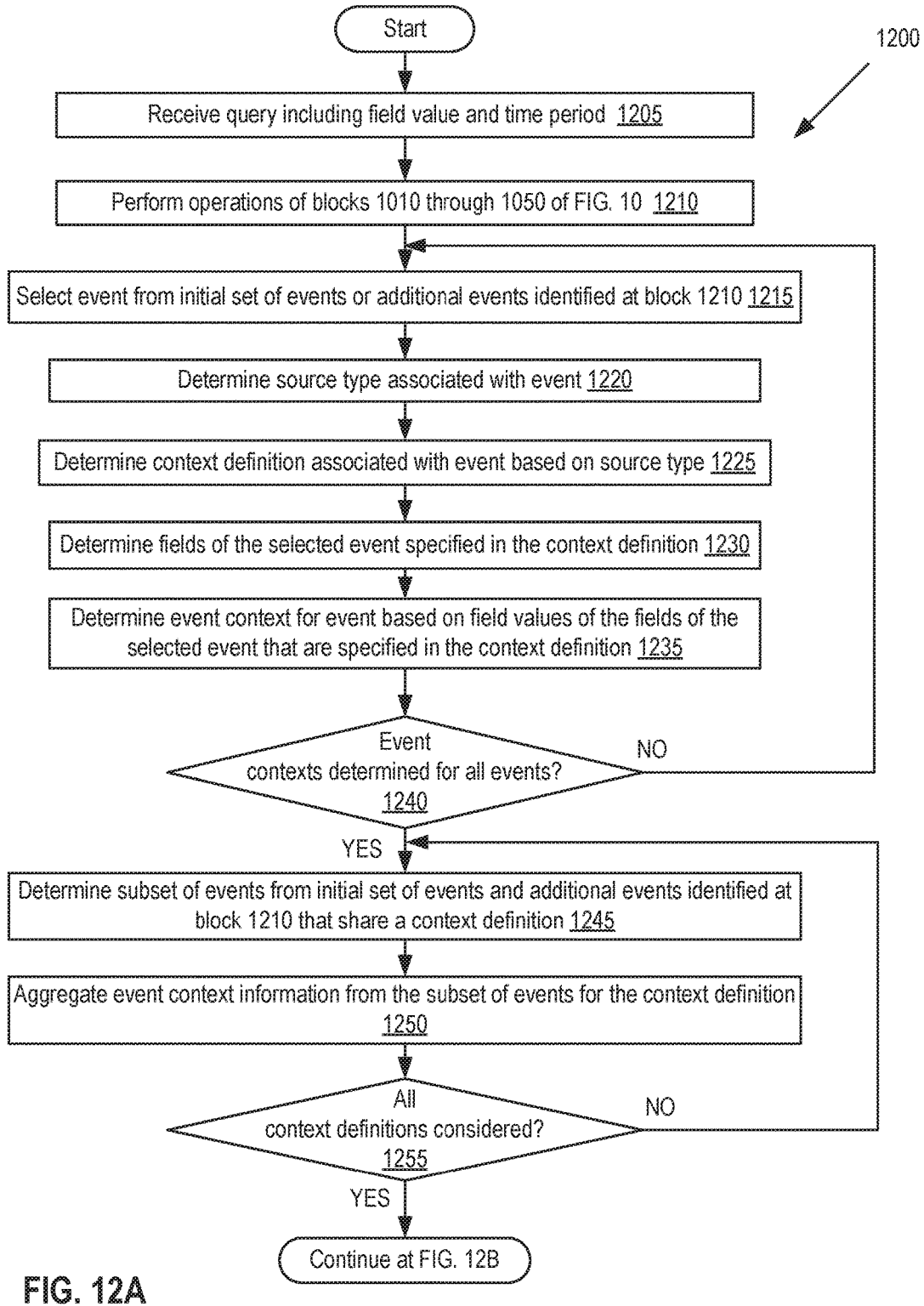
FIGS. 12A-12B together show a flow chart of one embodiment for a method of performing a search of events in a data store based on fields specified in context definitions.
Figure 12B:
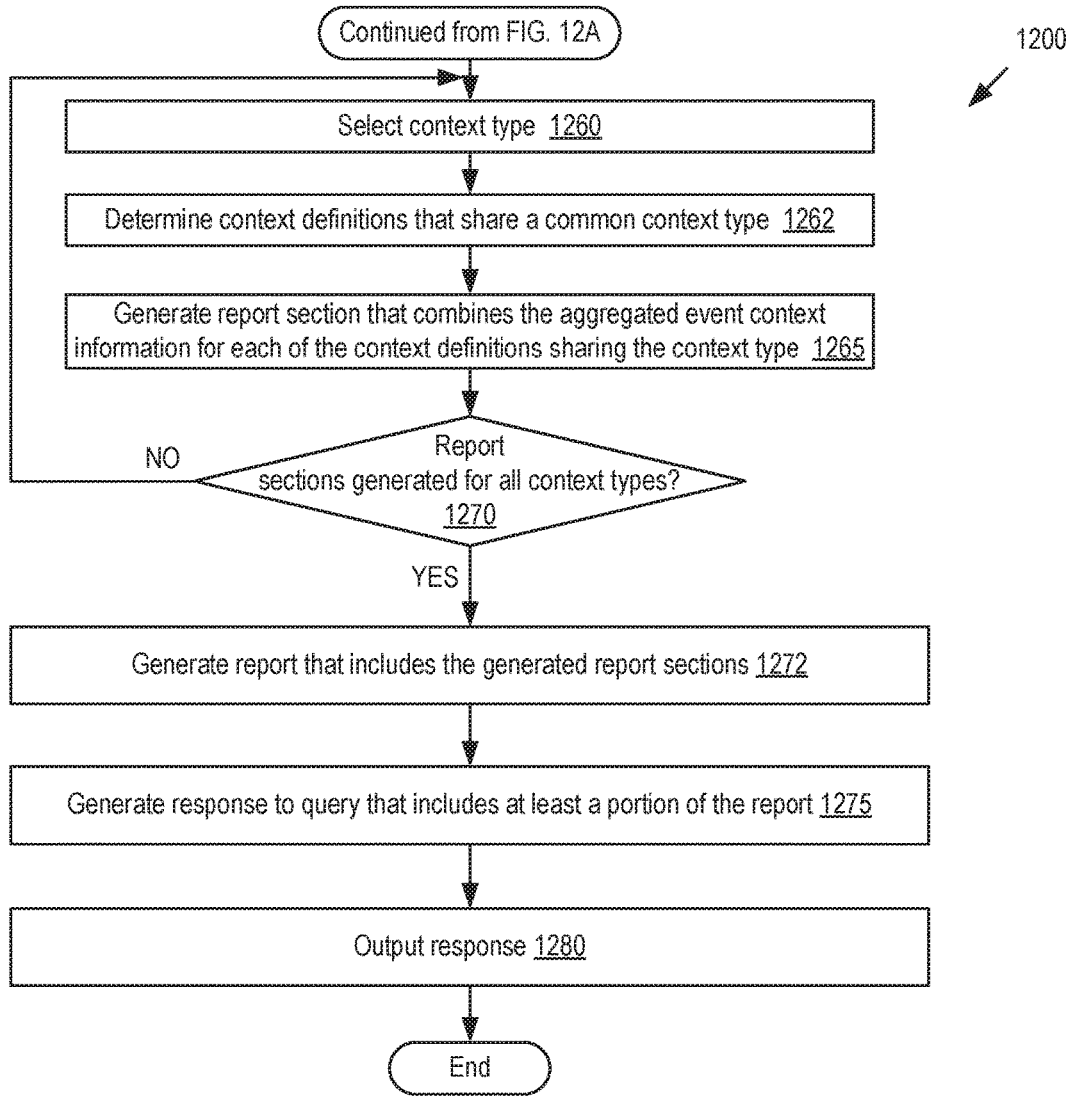

FIGS. 12A-12B together show a flow chart of one embodiment for a method 1200 of performing a search of events in a data store based on fields specified in context definitions. Method 1200 may be performed by a processing device executing, for example, a user interface and/or a service interface.

At block 1205 of method 1200, processing logic receives a query including a field value and a time period. The query may additionally include a field type associated with the field value. Additionally, the query may include multiple field values, one or more of which may be labeled with a field type.

At block 1210, processing logic performs the operations of blocks 1010 through 1050 of method 1000 described with reference to FIG. 10. At block 1215, processing logic selects an event from an initial set of events or additional events that were returned at block 1210. At block 1220, processing logic determines a source type associated with the selected event.

At block 1225, processing logic determines a context definition associated with event based on the source type. At block 1230, processing logic determines fields off the selected event that are specified in the context definition. At block 1235, processing logic determines an event context for the event based on the field values of the fields of the selected event that are specified in the context definition.

At block 1240, processing logic determines whether event contexts have been generated for all of the events that were returned at block 1210. If event contexts have not been generated for all of the events, the method returns to block 1215 and another event is selected. If event contexts have been generated for all of the events, the method continues to block 1245.

At block 1245, processing logic determines a subset of the events from the initial set of events and the additional events (e.g., a subset of the events returned at block 1210) that share a context definition. At block 1250, processing logic aggregates the event context information from the subset of events for the context definition.

At block 1255, processing logic determines whether all of the context definitions associated with events returned at block 1210 have been considered. If not all context definitions have been considered, the method returns to block 1245, and another subset of events that have another context definition are determined. If all context definitions associated with events returned at block 1210 have been considered, the method proceeds to block 1260.

At block 1260, processing logic selects a context type. At block 1262, processing logic determines context definitions associated with events returned at block 1210 that share a context type. At block 1265, processing logic generates a report section that combines the aggregated event context information for each of the context definitions sharing the context type.

At block 1270, processing logic determines whether report sections have been generated for each of the context types. If report sections have not been generated for all of the context types, the method returns to block 1260 and another context type is selected. If report sections have been generated for all of the context types, the method continues to block 1272.

At block 1272, processing logic generates a report that includes all of the generated report sections. At block 1275, processing logic generates a response to the initial query that includes at least a portion of the report. At block 1280, processing logic sends the report to a client that the query was received from.

Figure 13:
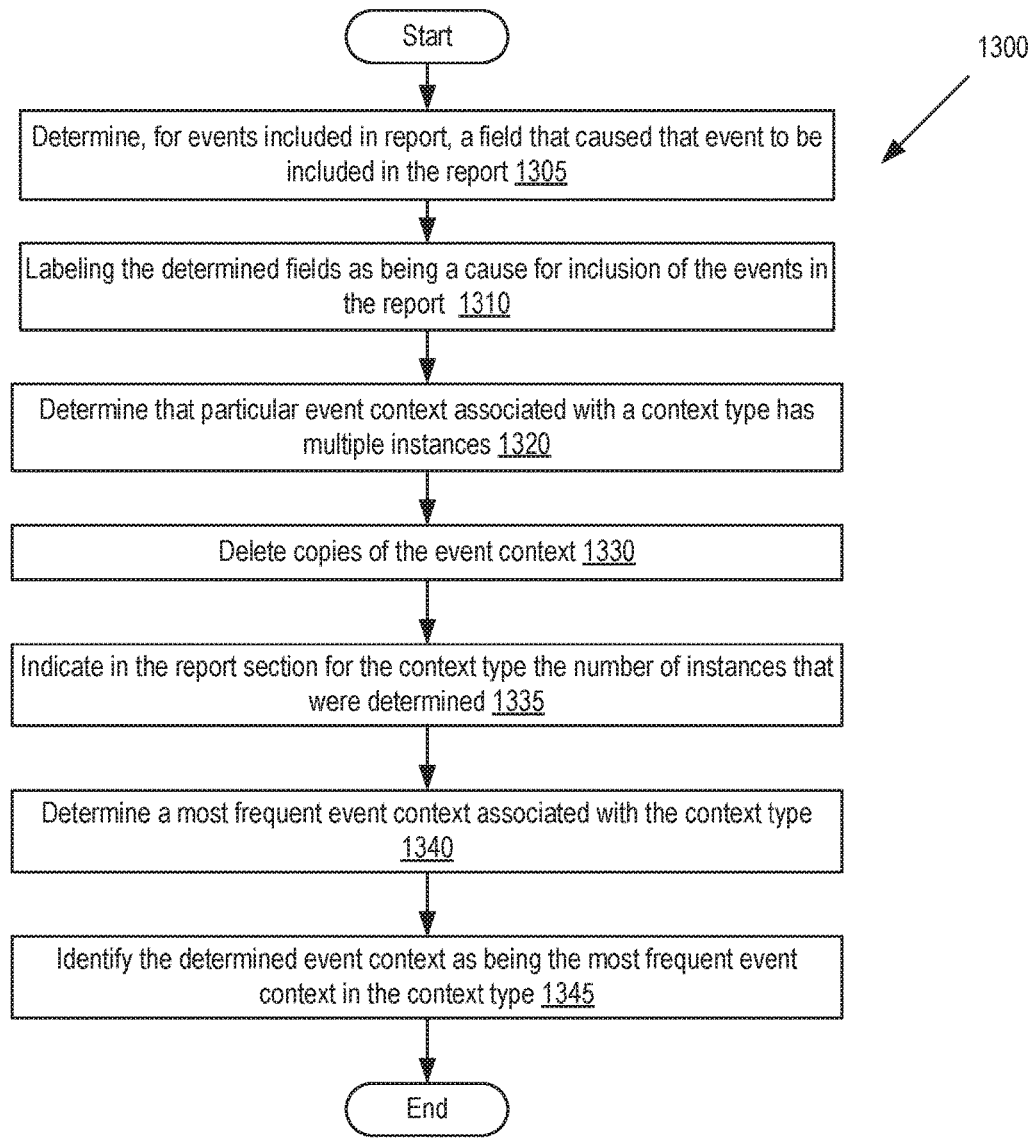
FIG. 13 is a flow chart of one embodiment for a method of aggregating event context information.

FIG. 13 is a flow chart of one embodiment for a method 1300 of aggregating event context information. In one embodiment, method 1300 is performed by a processing device executing a user interface and/or a service interface.

In one embodiment, method 1300 is performed at block 1055 of method 1000 and/or at block 1250 of method 1200.

At block 1305 of method 1300, processing logic determines, for an event included in a report, a field that caused the event to be included in the report. At block 1310, for an event, processing logic labels the determined field that caused that event to be included in the report as being a cause for inclusion of the event in the report. This may be performed for some or all of the events in the report. Some events may be included in the report because of multiple fields. For example, an event may have been returned from multiple recursive searches that were automatically performed. In such an instance, each of the fields that contributed to the event being included in the report may be indicated.

At block 1320, processing logic determines that a particular event context associated with a context type has multiple instances. At block 1330, processing logic deletes copies of the event context so that only a single copy off the event context remains. At block 1335, processing logic indicates in the report section for the context type the number of instances of the event context that were determined. This process may be performed for each event context included in a report.

At block 1340, processing logic determines a most frequent event context associated with a particular context type. At block 1345, processing logic identifies the determined event context as being the most frequent event context in the context type. This process may be performed for each off the context types.

Figure 14:
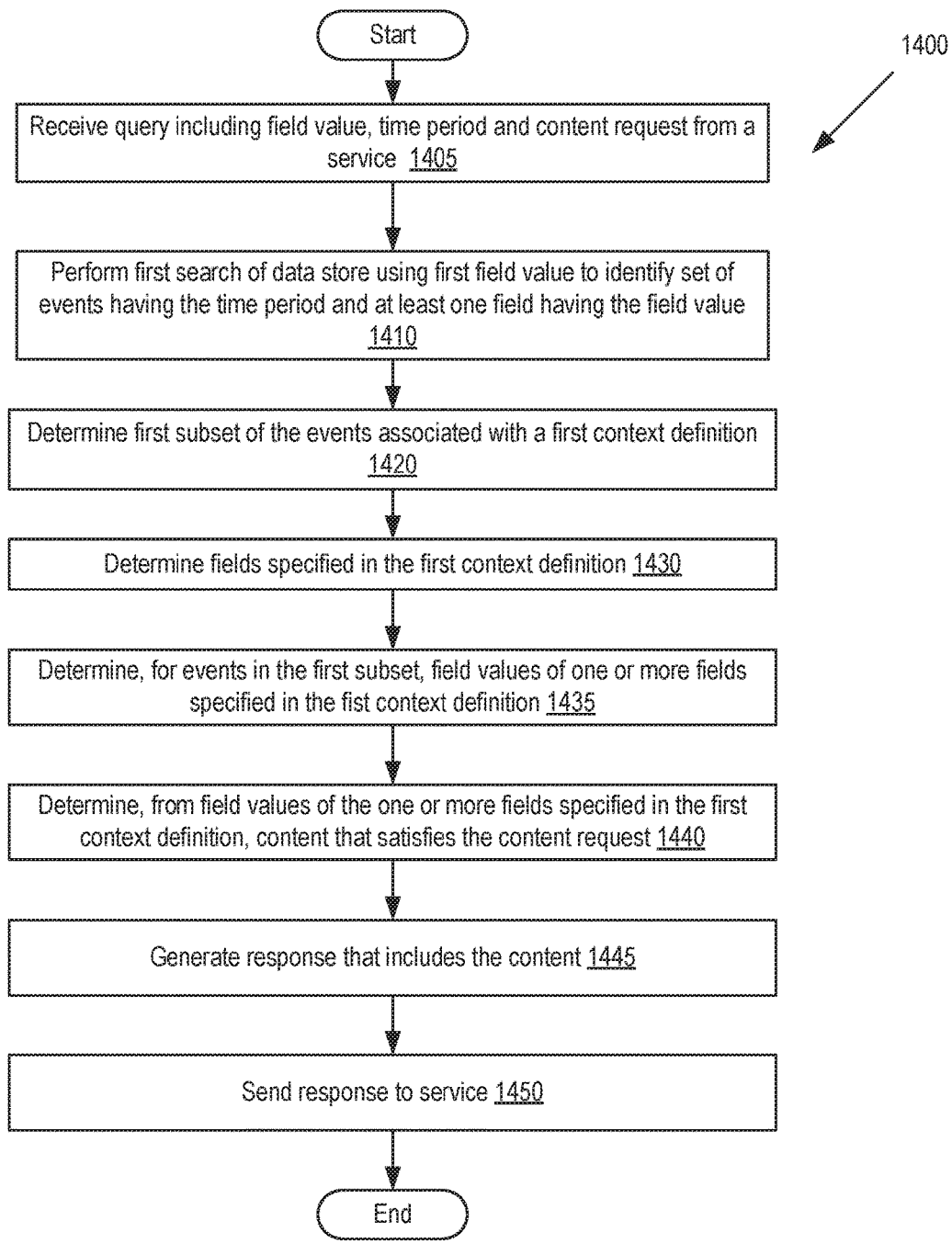
FIG. 14 is a flow chart of one embodiment for a method of searching for content that satisfies a content request in a query from a service.

FIG. 14 is a flow chart of one embodiment for a method 1400 of searching for content that satisfies a content request in a query from a service. In one embodiment, method 1400 is performed by a processing device executing a service interface.

At block 1405 of method 1400, processing logic receives a query including a field value, a time period and a content request. The query may additionally include a field type associated with the field value and/or may include multiple fields values. At block 1410, processing logic performs a first search of a data store (e.g., an event database) using the field value to identify a set of events having the time period and at least one field having the field value.

At block 1420, processing logic determines a first subset of the events that are associated with a context definition. At block 1430, processing logic determines fields that are specified by the context definition. At block 1435, processing logic determines, for events in the first subset, field values of one or more fields specified in the context definition. At block 1440, processing logic determines, from field values of the one or more fields specified in the first context definition, content that satisfies the content request. At block 1445, processing logic generates a response to the query that includes the content that is responsive to the content request. At block 1450, processing logic sends the response to the service.

Figure 15:
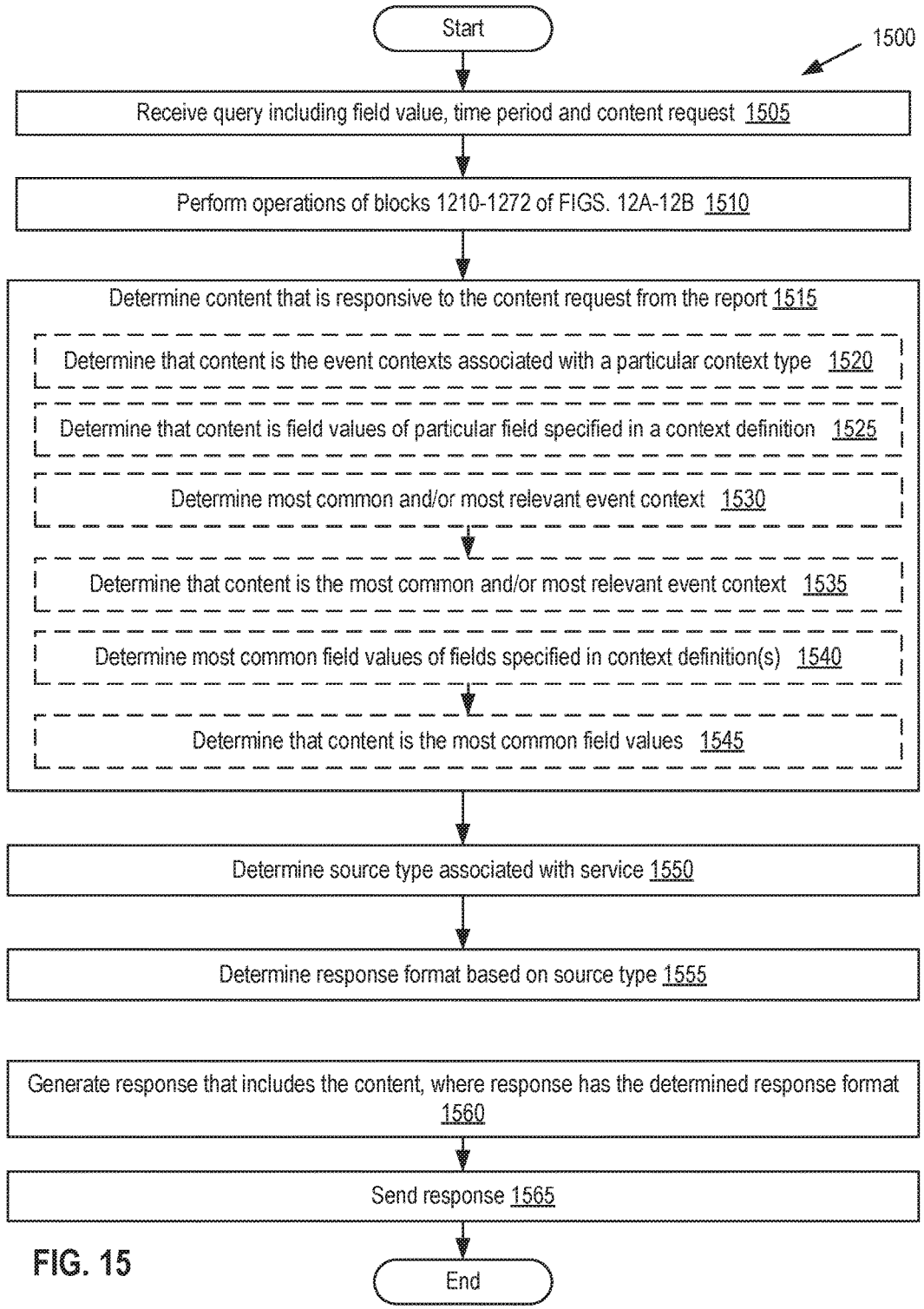
FIG. 15 is a flow chart of one embodiment for a method of determining content that is responsive to a content request in a query from a service.

FIG. 15 is a flow chart of one embodiment for a method 1500 of determining content that is responsive to a content request in a query from a service. In one embodiment, method 1500 is performed by a processing device executing a service interface.

At block 1505 of method 1500, processing logic receives a query including a field value (or multiple field values), a time period and a content request. At block 1510, processing logic performs the operations of blocks 1210-1272 of method 1200 described with reference to FIGS. 12A-12B. An output of block 1510 may be a report that includes event contexts generated from events returned from an initial search and one or more additional searches that were performed automatically based on context definitions and results of the initial search.

At block 1515, processing logic determines content that is responsive to the context request from the report. Depending on the nature of the content request, one or more different operations may be performed to determine the content. Additionally, the information included in the content may vary depending on the nature of the content request.

In one embodiment, the content request is for information associated with a particular context type. For example, a request may be for content associated with a network context type, content associated with an identity context type, content associated with an endpoint context type, content associated with an application context type, content associated with a data context type, content associated with a threat context type, and so on. In such an embodiment, at block 1520 processing logic determines that the content that will be responsive to the content request is the event contexts associated with a particular requested context type.

In one embodiment, the content request is for field values of particular fields of events. In such an embodiment, at block 1525 processing logic determines that the content that will be responsive to the content request is one or more field values of the particular field (or fields) specified in the content request. These fields may be fields that are also specified in a context definition.

In one embodiment, the content request is for a most common and/or most relevant event context. In such an embodiment, at block 1530 processing logic determines the most common and/or the most relevant event context. At block 1535 processing logic then determines that the content that is responsive to the content request is the determined most relevant and/or most common event context. The content request may additionally specify that the most relevant or most common event context associated with a particular context type is desired. In such an embodiment, only event contexts from that particular context type would be considered in the determination of the most relevant or the most common event context.

In some embodiments, a content request may specify that one or more most common field values are desired. These may be most common field values that are for one or more specified fields, for one or more specified field types specified in a context definition, for one or more specified context types, or a combination thereof. At block 1540, processing logic determines the most common field values of one or more fields. These fields would be fields that are specified in one or more context definitions in embodiments. At block 1545, processing logic would then determine the most common field values to be the content that satisfies the content request.

At block 1550, processing logic determines a source type associated with a service from which the query was received. At block 1555, processing logic determines a response format based on the source type. At block 1560, processing logic then generates a response that includes the content. The generated response would have the determined response format. At block 1565, processing logic then sends the generated response to the service from which the initial query was received.

Figure 16:
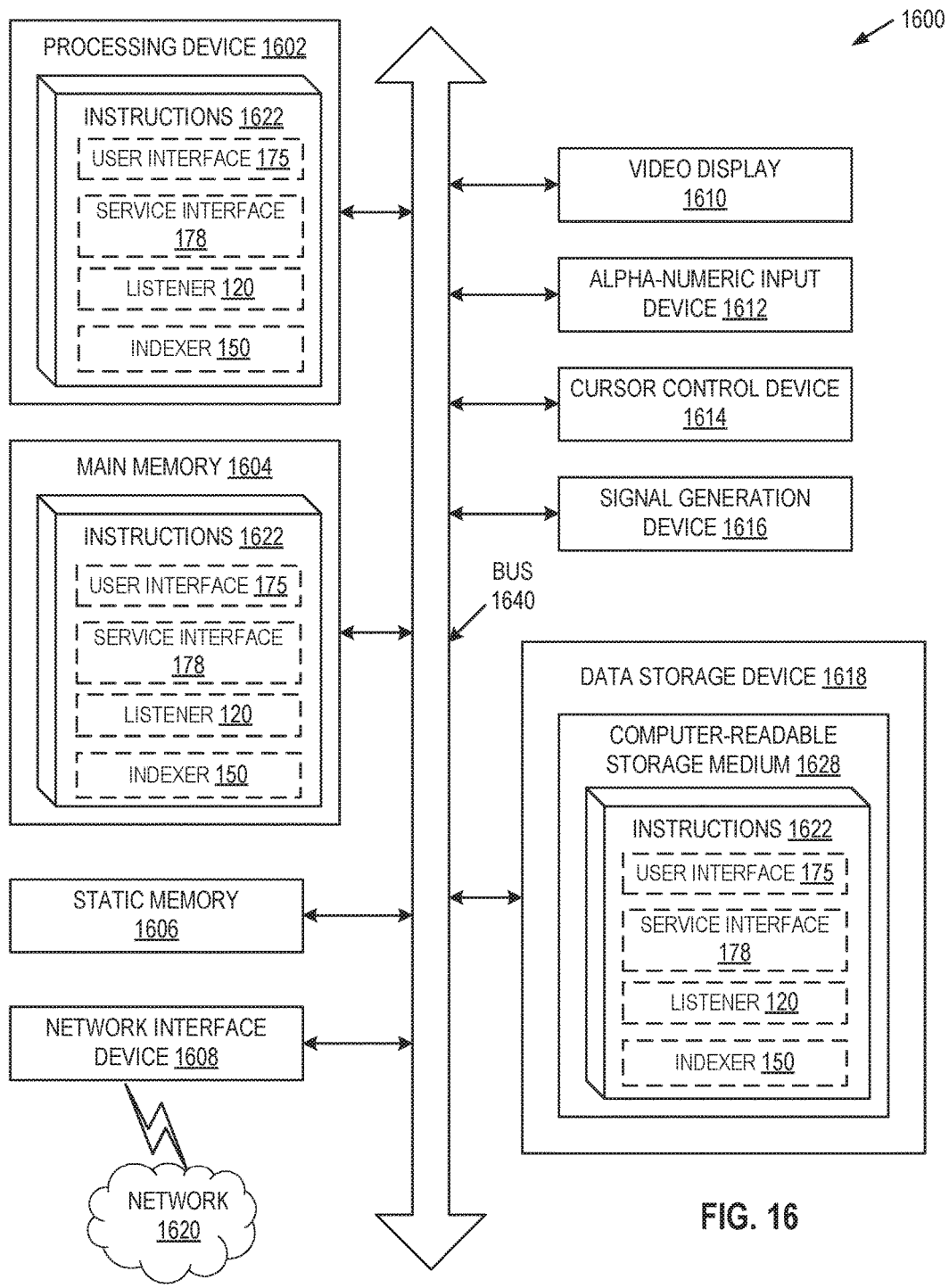
FIG. 16 illustrates a block diagram of one embodiment of a computing device.

FIG. 16 illustrates a diagrammatic representation of a machine in the example form of a computing device 1600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1600 includes a processing device 1602, a main memory 1604 (e.g., read-only memory (ROM), flash memory, dynamic random access memory (DRAM) such as synchronous DRAM (SDRAM) or Rambus DRAM (RDRAM), etc.), a static memory 1606 (e.g., flash memory, static random access memory (SRAM), etc.), and a secondary memory (e.g., a data storage device 1618), which communicate with each other via a bus 1630.

Processing device 1602 represents one or more general-purpose processors such as a microprocessor, central processing unit, or the like. More particularly, the processing device 1602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1602 may also be one or more special-purpose processing devices such as an application specific integrated circuit (ASIC), a field programmable gate array (FPGA), a digital signal processor (DSP), network processor, or the like. Processing device 1602 is configured to execute the processing logic (instructions 1622) for performing the operations and steps discussed herein.

The computing device 1600 may further include a network interface device 1608. The computing device 1600 also may include a video display unit 1610 (e.g., a liquid crystal display (LCD) or a cathode ray tube (CRT)), an alphanumeric input device 1612 (e.g., a keyboard), a cursor control device 1614 (e.g., a mouse), and a signal generation device 1616 (e.g., a speaker).

The data storage device 1618 may include a machine-readable storage medium (or more specifically a computer-readable storage medium) 1628 on which is stored one or more sets of instructions 1622 embodying any one or more of the methodologies or functions described herein. The instructions 1622 may also reside, completely or at least partially, within the main memory 1604 and/or within the processing device 1602 during execution thereof by the computer system 1600, the main memory 1604 and the processing device 1602 also constituting computer-readable storage media.

The computer-readable storage medium 1628 may also be used to store one or more of a user interface 175, a service interface 178, a listener 120 and an indexer 150 (as described with reference to FIGS. 1-4), and/or a software library containing methods that call a user interface 175, a service interface 178, a listener 120 and/or an indexer 150. While the computer-readable storage medium 1628 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "sending", "determining", "identifying", "parsing", "assigning", "writing", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving, by a processing device, a query comprising a first field value and a time period;
   performing, by the processing device, a first search of a data store using the first field value to identify a first plurality of events having the time period and at least one field that comprises the first field value;
   determining one or more additional searches to perform automatically based on the first plurality of events returned by the first search, wherein determining a second search to perform based on a first event of the plurality of events comprises:
      determining a first context definition associated with the first event, wherein the first context definition identifies a specified plurality of fields to use as link keys, each of the specified plurality of fields having assigned field types; and
      determining a second field value of a second field in the first event, wherein the second field is one of the plurality of fields in the first context definition that is specified to use as a link key;
   automatically performing, by the processing device without receipt of a second query, the second search of the data store using the second field value that was not included in the query to identify a second plurality of events having the time period and the second field value;
   aggregating information from the first plurality of events and the second plurality of events; and
   generating a response to the query that comprises the information aggregated from the first plurality of events and the second plurality of events.

2. The method of claim 1, further comprising:
   determining a first source type associated with the first event, wherein the first source type is based on a source of the first event; and
   determining the first context definition based on the first source type.

3. The method of claim 1, further comprising:
   determining that a second event of the plurality of events is associated with a second context definition;
   determining, for the second event, a third field value of a third field that is specified in the second context definition;
   automatically performing a third search of the data store using the third field value to identify a third plurality of events having the time period and the third field value; and
   aggregating information from the third plurality of events to the information from the first plurality of events and the second plurality of events, wherein the response further comprises the information from the third plurality of events.

4. The method of claim 3, wherein the response comprises a first section comprising a first set of field values of a first set of fields specified in the first context definition and a second section comprising a second set of field values of a second set of fields specified in the second context definition.

5. The method of claim 1, further comprising:
  determining that a second event of the first plurality of events is associated with the first context definition;
  determining, for the second event, a third field value of the second field;
  automatically performing a third search of the data store using the third field value to identify a third plurality of events having the time period and the third field value; and
  aggregating information from the third plurality of events to the information from the first plurality of events and the second plurality of events, wherein the response further comprises the information from the third plurality of events.

6. The method of claim 1, wherein the data store comprises a database, the method further comprising:
  adding an additional field to the first context definition without modifying a schema of the database;
  determining, for the first event, a third field value of the additional field;
  performing a third search of the data store using the third field value to identify a third plurality of events having the time period and the third field value; and
  aggregating information from the third plurality of events to the information from the first plurality of events and the second plurality of events, wherein the response further comprises the information from the third plurality of events.

7. The method of claim 1, wherein the first context definition is an entry in configuration data that is stored at a location other than the data store.

8. A non-transitory computer readable storage medium comprising instructions that, when executed by a processing device, cause the processing device to perform operations comprising:
  receiving, by the processing device, a query comprising a first field value and a time period;
  determining one or more additional searches to perform automatically based on a first plurality of events returned by a first search, wherein determining a second search to perform based on a first event of the plurality of events comprises:
    determining a first context definition associated with the first event, wherein the first context definition identifies a specified plurality of fields to use as link keys, each of the specified plurality of fields having assigned field types; and
    determining a second field value of a second field in the first event, wherein the second field is one of the plurality of fields in the first context definition that is specified to use as a link key;
  automatically performing, by the processing device without receipt of a second query, the second search of a data store using the second field value that was not included in the query to identify a second plurality of events having the time period and the second field value;
  aggregating information from the first plurality of events and the second plurality of events; and
  generating a response to the query that comprises the information aggregated from the first plurality of events and the second plurality of events.

9. The non-transitory computer readable storage medium of claim 8, the operations further comprising:
  determining a first source type associated with the first event, wherein the first source type is based on a source of the first event; and
  determining the first context definition based on the first source type.

10. The non-transitory computer readable storage medium of claim 8, the operations further comprising:
  determining that a second event of the plurality of events is associated with a second context definition;
  determining, for the second event, a third field value of a third field that is specified in the second context definition;
  automatically performing a third search of the data store using the third field value to identify a third plurality of events having the time period and the third field value; and
  aggregating information from the third plurality of events to the information from the first plurality of events and the second plurality of events, wherein the response further comprises the information from the third plurality of events.

11. The non-transitory computer readable storage medium of claim 10, wherein the response comprises a first section comprising a first set of field values of a first set of fields specified in the first context definition and a second section comprising a second set of field values of a second set of fields specified in the second context definition.

12. The non-transitory computer readable storage medium of claim 8, the operations further comprising:
  determining that a second event of the first plurality of events is associated with the first context definition;
  determining, for the second event, a third field value of the second field;
performing a third search of the data store using the third field value to identify a third plurality of events having the time period and the third field value; and
  aggregating information from the third plurality of events to the information from the first plurality of events and the second plurality of events, wherein the response further comprises the information from the third plurality of events.

13. The non-transitory computer readable storage medium of claim 8, wherein the data store comprises a database, the operations further comprising:
  adding an additional field to the first context definition without modifying a schema of the database;
  determining, for the first event, a third field value of the additional field;
performing a third search of the data store using the third field value to identify a third plurality of events having the time period and the third field value; and
  aggregating information from the third plurality of events to the information from the first plurality of events and the second plurality of events, wherein the response further comprises the information from the third plurality of events.

14. The non-transitory computer readable storage medium of claim 8, wherein the first context definition is an entry in configuration data that is stored at a location other than the data store.

15. A computing device comprising:
  a memory; and
  a processing device connected to the memory, wherein the processing device is configured to:
    receive a query comprising a first field value and a time period;
    perform a first search of a data store using the first field value to identify a first plurality of events having the time period and at least one field that comprises the first field value;

determine one or more additional searches to perform automatically based on the first plurality of events returned by the first search, wherein determining a second search to perform based on a first event of the plurality of events comprises:

determining a first context definition associated with the first event, wherein the first context definition identifies a specified plurality of fields to use as link keys, each of the specified plurality of fields having assigned field types; and determining a second field value of a second field in the first event, wherein the second filed is one of the plurality of fields in the first context definition is specified to use as a link key;

automatically perform, without receipt of a second query, the second search of the data store using the second field value that was not included in the query to identify a second plurality of events having the time period and the second field value;

aggregate information from the first plurality of events and the second plurality of events; and generate a response to the query that comprises the information aggregated from the first plurality of events and the second plurality of events.

16. The computing device claim 15, wherein the processing device is further to:

determine a first source type associated with the first event, wherein the first source type is based on a source of the first event; and determine the first context definition based on the first source type.

17. The computing device of claim 15, wherein the processing device is further to:

determine that a second event of the plurality of events is associated with a second context definition;

determine, for the second event, a third field value of a third field that is specified in the second context definition;

automatically perform a third search of the data store using the third field value to identify a third plurality of events having the time period and the third field value; and aggregate information from the third plurality of events to the information from the first plurality of events and the second plurality of events, wherein the response further comprises the information from the third plurality of events.

18. The computing device of claim 17, wherein the response comprises a first section comprising a first set of field values of a first set of fields specified in the first context definition and a second section comprising a second set of field values of a second set of fields specified in the second context definition.

19. The computing device of claim 15, wherein the processing device is further to:

determine that a second event of the first plurality of events is associated with the first context definition;

determine, for the second event, a third field value of the second field;

automatically perform a third search of the data store using the third field value to identify a third plurality of events having the time period and the third field value; and aggregate information from the third plurality of events to the information from the first plurality of events and the second plurality of events, wherein the response further comprises the information from the third plurality of events.

20. The computing device of claim 15, wherein the data store comprises a database, and wherein the processing device is further to:

add an additional field to the first context definition without modifying a schema of the database;

determine, for the first event, a third field value of the additional field;

perform a third search of the data store using the third field value to identify a third plurality of events having the time period and the third field value; and aggregate information from the third plurality of events to the information from the first plurality of events and the second plurality of events, wherein the response further comprises the information from the third plurality of events.

* * * * *